US010970180B2

(12) United States Patent
Li et al.

(10) Patent No.: US 10,970,180 B2
(45) Date of Patent: Apr. 6, 2021

(54) METHODS AND APPARATUS FOR VERIFYING PROCESSING RESULTS AND/OR TAKING CORRECTIVE ACTIONS IN RESPONSE TO A DETECTED INVALID RESULT

(71) Applicant: NAKAMOTO & TURING LABS INC, New York, NY (US)

(72) Inventors: Chong Li, Weehawken, NJ (US); Sichao Yang, Basking Ridge, NJ (US); Lei Zhang, West New York, NJ (US)

(73) Assignee: NAKAMOTO & TURING LABS INC, New York, NY (US)

(*) Notice: Subject to any disclaimer, the term of this patent is extended or adjusted under 35 U.S.C. 154(b) by 50 days.

(21) Appl. No.: 16/370,629

(22) Filed: Mar. 29, 2019

(65) Prior Publication Data

US 2020/0310929 A1 Oct. 1, 2020

(51) Int. Cl.
| | |
|---|---|
| *G06F 11/00* | (2006.01) |
| *G06F 11/20* | (2006.01) |
| *G06F 11/07* | (2006.01) |
| *H04L 12/24* | (2006.01) |
| *H04L 9/06* | (2006.01) |
| *G06F 9/50* | (2006.01) |
| *H04L 12/26* | (2006.01) |
| *H04L 29/06* | (2006.01) |
| *G06F 11/16* | (2006.01) |

(52) U.S. Cl.
CPC ........ *G06F 11/2025* (2013.01); *G06F 9/5072* (2013.01); *G06F 11/0709* (2013.01); *G06F 11/1608* (2013.01); *H04L 9/0637* (2013.01); *H04L 41/0668* (2013.01); *H04L 43/50* (2013.01); *H04L 63/0428* (2013.01)

(58) Field of Classification Search
CPC .................... G06F 11/1608; G06F 2207/7271
See application file for complete search history.

(56) References Cited

U.S. PATENT DOCUMENTS

| | | | | |
|---|---|---|---|---|
| 6,950,937 B2* | 9/2005 | Jakobsson | ............... | G06F 7/723 380/37 |
| 7,426,749 B2* | 9/2008 | Gerard | .................... | G06F 21/14 713/180 |
| 8,255,691 B2* | 8/2012 | Yi | .......................... | H04L 9/3247 713/176 |
| 9,846,596 B1* | 12/2017 | Nogin | .................... | G06F 9/5027 |
| 2003/0046547 A1* | 3/2003 | Jakobsson | ............... | G06F 7/723 713/180 |
| 2015/0341326 A1* | 11/2015 | Premnath | .............. | H04L 63/062 713/171 |
| 2017/0242760 A1* | 8/2017 | Tanaka | ................ | G06F 11/1608 |
| 2017/0302663 A1* | 10/2017 | Nainar | .................. | H04L 63/123 |

(Continued)

OTHER PUBLICATIONS

Canonchain Reforging the Cornerstone of the Blockchain World, Whitepaper, http://www.canonchain.com/, Dec. 31, 2017, 36 pages.

(Continued)

*Primary Examiner* — Jonathan D Gibson
(74) *Attorney, Agent, or Firm* — Straub & Straub; Michael P. Straub; Stephen T. Straub

(57) ABSTRACT

Methods and apparatus for detecting that a processing node, in a network including a plurality of processing nodes, is reporting invalid results and for taking corrective actions in response to the detection are described.

20 Claims, 23 Drawing Sheets

(56) References Cited

U.S. PATENT DOCUMENTS

| | | | |
|---|---|---|---|
| 2018/0343110 A1* | 11/2018 | Funk | G06F 21/6218 |
| 2019/0156336 A1* | 5/2019 | Kasthuri | H04L 9/3236 |
| 2019/0356674 A1* | 11/2019 | Irazabal | H04L 63/105 |
| 2020/0084046 A1* | 3/2020 | Bessonov | H04L 9/3239 |
| 2020/0119904 A1* | 4/2020 | Philyaw | G06F 16/2379 |
| 2020/0286087 A1* | 9/2020 | Ma | H04L 9/0637 |

OTHER PUBLICATIONS

The Golem Project, Whitepaper, https://golem.network/home/, Nov. 2016, 28 pages.

About SONM, Whitepaper, downloaded from https://sonm.com/, Dec. 20, 2018, 4 pages.

Eli Ben-Sasson, Alessandro Chiesa, Christina Garman, Matthew Green, Ian Miers, Eran Tromer and Madars Virza, Zerocash: Decentralized Anonymous Payments from Bitcoin (extended version), May 18, 2014, 56 pages.

Bryan Parno, Craig Gentry, Jon Howell, and Mariana Raykova, "Pinocchio: Nearly practical verifiable computation", IEEE Symposium on Security and Privacy, Oakland, 2013, 16 pages.

Eli Ben-Sasson, Alessandro Chiesa, Daniel Genkin, Eran Tromer, and Madars Virza, SNARKs for C: verifying program executions succinctly and in zero knowledge, In CRYPTO, Oct. 7, 2013, 53 pages.

Michael Walfish and Andrew J. Blumberg, Verifying Computations without Reexecuting Them, Communications of the ACM, Feb. 2015, pp. 74-84, vol. 58, No. 2.

Wikipedia, https://en.wikipedia.org/wiki/Entrapment, Nov. 15, 2018, 10 pages.

Jason Teutsch and Christian Reitwiessner, "A scalable verification solution for blockchains", https://people.cs.uchicago.edu/ teutsch/papers/truebit.pdf, Nov. 16, 2017, 50 pages.

Christopher D. Coath, Robert C. J. Steele and W. Fred Lunnon, Statistical bias in isotope ratios, Journal of Analytical Atomic Spectrometry, 2013, pp. 52-58 also Published on Nov. 13, 2012 on http://pubs.rsc.org | doi:10.1039/C2JA10205F.

Stephen Boyd and Lieven Vandenberghe, Convex Optimization, 2004, 730 pages, Cambridge Univ. Press, Cambridge, U.K.

\* cited by examiner

METHODS AND APPARATUS FOR VERIFYING PROCESSING RESULTS AND/OR TAKING CORRECTIVE ACTIONS IN RESPONSE TO A DETECTED INVALID RESULT

FIELD

The present application relates to processing verification methods and apparatus in a system including multiple network nodes, and more particularly, to methods and apparatus for efficiently detecting processing nodes which are returning invalid results and taking corrective actions in response to the detection.

BACKGROUND

Like electricity, nowadays computing power is an essential utility in human's daily life, ranging from education, science to marketing and media. Recently, many real-world problems are being reshaped by mathematically analyzing big data. This trend leads to a stronger need for computing power. However, access to powerful computing devices (e.g., cloud center) has always been unfair and undemocratic as the cost of using these computing devices is typically high. On the other hand, the waste of computing power from billions of idle devices in families and data centers around the globe is tremendous. Thus, how to utilize these idle computing devices to satisfy the growing need for computing power becomes an intriguing and challenging research topic. Along the line, blockchain technology is promising in the sense that these idle geo-distributed computing devices can be tied together by a blockchain network, a server-less and secure network. A blockchain is a distributed ledger that is owned by the whole network and is designed to be tamper proof. Specifically, a client/user on the network can rent the computing power from a computing power provider (provider in short) anywhere in the world to help complete a computing task. The task can be machine learning training, 3D rendering, scientific computation and more.

However, a long-standing problem of outsourcing computational tasks to another party is how a client/user can verify the result efficiently without re-executing the task. On one hand, providers do not necessarily have strong incentives to ensure correctness. On the other hand, for complex and large scale providers (e.g., cloud servers), it is unlikely to guarantee that the execution is always correct due to mis-configurations, randomness in hardware and more. This problem, recognized as verifiable computing, remains to be addressed in a way that provides a practical solution.

SUMMARY

Various exemplary methods and apparatus relate to verifying processing in a system which may, and sometimes does, include nodes of different types which work together, e.g., to perform processing tasks that may be performed by processing nodes that can be owned and controlled by different entities, while still providing a high degree of reliability that accurate processing results will be provided in response to processing tasks for which the processing node or the owner of the processing node may be and sometimes is compensated. A blockchain is used in various embodiments to store information in a reliable manner. In some embodiments a blockchain is used to ensure that information from nodes, referred to as officer nodes, that perform checks on the processing results of other nodes and nodes, referred to as judge nodes, that declare determinations made by officer nodes to be valid, are convincingly recorded and the whole system used to check and enforce actions based on validity determinations is running in a decentralized and trustable manner.

In various embodiments the system includes one or more of each of the following different types of nodes: officer node, witness node, enforcement node, and processing node.

An officer node (ON) is a node which stores a set of fishing tasks (FTs), each fishing task (FT) represented as fishing task script (FTS), and corresponding fishing task confirmed results. An officer node sends a fishing task script to one or more processing nodes, and checks the result to determine if the processing nodes are accurately performing processing tasks to which they are assigned. In one embodiment an exemplary system include N1 officer nodes (officer node 1, officer node 2, . . . , officer node N1.)

Witness nodes (WNs) are high reliability processing node which process and provide results to tasks, referred to as fishing tasks, which may be supplied to processing nodes to check if they are operating correctly and providing accurate processing result in response to processing tasks they perform. Witness nodes, because of their high reliability are used, in some embodiments, by an officer node to obtain a confirmed fishing task result, e.g. as part of a building a set of fishing tasks and confirmed results. In one embodiment the exemplary system include N2 witness nodes (witness node 1, witness node 2, . . . , witness node N2.)

Enforcement nodes, sometimes also referred to as judge nodes (JNs), confirm that a processing node indicated to have provided an invalid result to a fishing task, e.g., based on an officer node's determination, did in fact fail to provide an invalid result. In one embodiment the exemplary system include N3 enforcement nodes (judge node 1, judge node 2, . . . , judge node N3.)

Processing nodes (PNs) perform processing operations in response to processing tasks and return processing results, some of the processing tasks assigned to processing node may be fishing tasks used to check that a processing node is operating and providing accurate processing results. The processing node is unaware that a processing task assigned to it is a fishing task. In one embodiment the exemplary system include N4 processing nodes (processing node 1, processing node 2, . . . , processing node N4.) In various embodiments N4 is much larger than N2, e.g. N4 is at least 10 times larger than N2.

General operation of the system and the method of checking the reliability of processing performed by nodes in the system will now be discussed.

In some embodiments an officer node, e.g., first officer node (ON1) sends fishing tasks (FTs) including first fishing task (FT1), represented by a first fishing task script (FTS1), to multiple witness nodes (WN1 . . . WN N2) for processing. The first officer node receives results (WN1FTR1, WNN2FTR1) from witness nodes (WN1, . . . , WN N2), respectively, for the first fishing task (FT1), represented by the first fishing task script (FTS1). Similarly, the first officer node receives results (WN1FTR2, . . . , WNN2FTR2) from witness nodes (WN1, . . . , WN N2), respectively, for the second fishing task (FT2), represented by a second fishing task script (FTS2). For each fishing task, the first officer node (ON1) compares the results received from multiple witness nodes, and when the received results from the multiple witness nodes match, the first officer node determines that the result is a confirmed result for the corresponding fishing task. For example if the same value is returned from each of the witness nodes that performs the first fishing task, then the returned value becomes the first fishing task confirmed result (FTCR1) and is stored as such.

The first officer node encrypts first fishing task script (FTS1) using a secret key, e.g., private key PK1, known to the first officer node (ON1), to generate an encrypted copy of the first fishing task script (ECFTS1). The first officer node encrypts first fishing task confirmed result (FTCR1) using the secret key, e.g., private key PK1, known to the first officer node (ON1) to generate an encrypted copy of the first fishing task confirmed result (ECFTCR1).

Similarly each separate fishing task script and corresponding fishing task result, once confirmed, may be, and sometimes are, encrypted using a separate secret key known to the first officer node (ON1). For example, there is a second private key (PK2), which is used for encrypting the second fishing task script (FTS2) and the corresponding second fishing task confirmed result (FTCR2).

For each fishing task, the first officer node generates an abstract for the fishing task. In one exemplary embodiment, the abstract is generated from a private key, a fishing task script, and a fishing task script confirmed result, using a known hash function. For example an abstract (A1) for first fishing task (FT1) is generated from FTS1, PK1, and FTCR1, using the known hash function, and the result is a first hash result.

For each fishing task with a confirmed result, the first officer node sends the encrypted fishing task script, the encrypted fishing task confirmed result and the fishing task abstract, to other nodes including a first enforcement node, e.g. judge node 1 (JN1). For example for the first fishing task (FT1), the first officer node (ON1) sends FTS1, FTCR1, and A1 to node including first enforcement node (JN1). In our system, sending the encrypted information to other nodes means this information is added to a blockchain (of which information is transparent to other nodes in the network) such that this information will not be changeable in the future.

At this time the first officer node does not supply the encryption key to the enforcement node(s), each key corresponding to a different fishing task. Thus the enforcement node has the confirmed results for each of the fishing tasks, in encrypted form but is unable to recover the confirmed results for a particular fishing task until the first officer node supplies the private key used for that fishing task.

During operation the officer node ON1 sends out fishing tasks, for which it already has stored confirmed results. For example fishing task script (FTS1) is sent to one or more processing nodes (PNs). The first officer node (ON1) receives the results from the processing nodes and checks to determine if the provided results are valid. For example processing node 1 (PN1) may return PN1FTR1 as the result to fishing task script FTS1 supplied by first officer node (ON1). The first officer node (ON1), receiving the response (PN1FTR1) to the fishing task script (FTS1) compares received result (PN1FTR1) to the first fishing task confirmed result (FTCR1) which it has stored. If PN1FTR1=FTCR1, then the received result (PN1FTR1) from PN1 is determined to be valid. However if the first officer node (ON1) determines that the returned result (PN1FTR1) returned from processing node 1 (PN1), does not match the first fishing task confirmed result (FTCR1), the first officer node (ON 1) determines that the processing node 1 (PN1) is returning invalid results, e.g., because it is faulty or for other reasons.

In response to detecting that PN1 is returning invalid results, the first officer node (ON1) reports to one or more enforcement nodes, e.g. Judge node 1 (JN1), that PN1 is returning invalid results. Along with the report of an invalid result, the first officer node (ON1) provides an indication of which previously supplied fishing task the processing node failed to provide correct results for, e.g., FT1 represented by FTS1, along with the secret key, e.g., PK1, needed by the enforcement node, e.g., judge node, to decrypt the previously supplied encrypted copy of the fishing task script, e.g., ECFTS1, and the encrypted copy of the fishing task confirmed result, e.g., ECFTCR1. In some embodiments, the officer node also supplies the result from the first processing node, e.g. PN1FTR1, received from the processing node (PN1) which was determined to be supplying an invalid result, e.g., if the enforcement node, e.g., JN1, was not already supplied with the result, e.g., in a broadcast message, from the processing node PN1.

The enforcement node, e.g. judgment node JN1, recovers the previously confirmed result for the first fishing task (FTCR1), by decrypting the encrypted copy of the first fishing task confirmed result (ECFTCR1) using the secret key (PK1) provided by first officer node (ON1) and also recovers the first fishing task script (FTS1) by decrypting the encrypted copy of the first fishing task script (ECFTS1) using the secret key (PK1). In some embodiments, the enforcement node generates a second hash result using the known hash function, PK1, FTS1 and FTCR1, and then compares the second hash result to the abstract A1, which is a first hash result. In some such embodiments, the enforcement node confirms that the second hash result matches the received abstract (A1).

The enforcement node, e.g. Judgment node JN1, confirms that the first processing node PN1 did in fact return incorrect results and reports that PN1 is returning invalid results to the other nodes in the system, e.g., other nodes in the blockchain network. In some embodiments, the other nodes in the system respond by removing PN1 from a list of nodes which can be trusted to supply processing results to computing tasks and/or PN1 is penalized for providing invalid results to other nodes in the system. In some embodiments, the enforcement node, e.g. judgment node notifies other nodes in the system to remove PN1 from a list of nodes allowed to perform computing tasks, e.g., in response to determining that PN1 returned an invalid result.

Enforcement, e.g., judge, node actions can and sometimes are implemented by a verification smart contract running on the enforcement node. The verification smart contract in some embodiments is a set of programs run on the block chain. In some embodiment the verification smart contract will execute on the judge node and perform, the following operations in order. 1) fishing-task verification: using the fishing-task information submitted by the officer node, the contract will first confirm if this fishing task is a network-verified task. For example, the smart contract will generate the abstract from the fishing-task information and compare it with the one stored on the blockchain which was submitted by the officer in the phase of building her fishing-task repository; 2) perform result verification, e.g., the smart contract will verify the results from the PN1; and 3) perform incentive distribution, e.g., if the processing node's (e.g., PN1's) result is proved to be incorrect, the contract will reward the officer from the incentive pool, and have the provider's deposit forfeited and contributed to the incentive pool.

The first officer node (ON1), which detected the faulty results being provided by PN1 through the allocation of a fishing task, is rewarded in some embodiments for detecting that PN1 was providing faulty results. The reward may be, and sometimes is, in the form of the right to use processing resources or having computational tasks performed by other nodes in the system to the benefit of the first officer node (ON1) or an entity operating ON1. In this way the first officer node (ON1) can be compensated for the effort required to perform officer related tasks that may not provide computational benefits to the first officer node (ON1).

In some embodiments the first officer node (ON1) uses as fishing tasks, tasks for which the operator of first officer node (ON1) wishes to have performed and for which the first officer node (ON1) may be required to compensate other nodes for performing processing operations. In such cases by storing the results of tasks which were being performed for other reasons and reusing them as fishing tasks, the first officer node (ON1) can create a fishing task repository while limiting the processing burden placed on other nodes in creating the fishing task repository.

Compensation to the first officer node (ON1) can be varied to increase or decrease the number of fishing tasks the first officer node (ON1) sends out and checks to varying the rate at which fishing tasks are sent out and the results confirmed, e.g., as a function of network load and/or system reliability. For example as the number of invalid results are detected in response to fishing tasks increases the rate at which fishing tasks are sent out for processing and checking to processing nodes may increase and as the rate of invalid results decreases as a portion of the total number of computational tasks being performed on an ongoing basis, the rate at which fishing tasks are sent out to check the work of processing nodes can and sometimes is decreased.

An exemplary processing verification method for use in a system including multiple network nodes, the method comprises receiving, at an enforcement node (e.g., judge node JN1) which maintains a copy of a blockchain, from a first officer node (ON1), a first abstract (A1) of a first fishing task (FT1), said first abstract (A1) having been generated from at least i) a first private encryption key (PK1) and ii) a first fishing task confirmed result (FTCR1) corresponding to a fishing task script (FTS1), said first fishing task script (FTS1) specifying computations to be preformed as part of a first fishing task (FT1); and storing, in the enforcement node (e.g., judge node 1 (JN1)), the first abstract; receiving at the enforcement node (JN1) a first fishing task result (PN1FTR1), which is a processing result that was generated by a first processing node (PN1) (this can be received in a broadcast from PN1 to the block chain); receiving at the enforcement node (JN1) from the first officer node (ON1) an indication that an invalid processing result (PN1FTR1) was received from the first processing node (PN1) in response to the first fishing task (FT1) assigned to the first processing node (PN1); operating (276) the enforcement node (JN1) to confirm that the result (PN1FTR1) provided by the first processing node (PN1) in response to the first fishing task (FT1) was invalid.

While various features discussed in the summary are used in some embodiments it should be appreciated that not all features are required or necessary for all embodiments and the mention of features in the summary should in no way be interpreted as implying that the feature is necessary or critical for all embodiments.

Numerous additional features and embodiments are discussed in the detailed description which follows.

DETAILED DESCRIPTION

Figure 1:
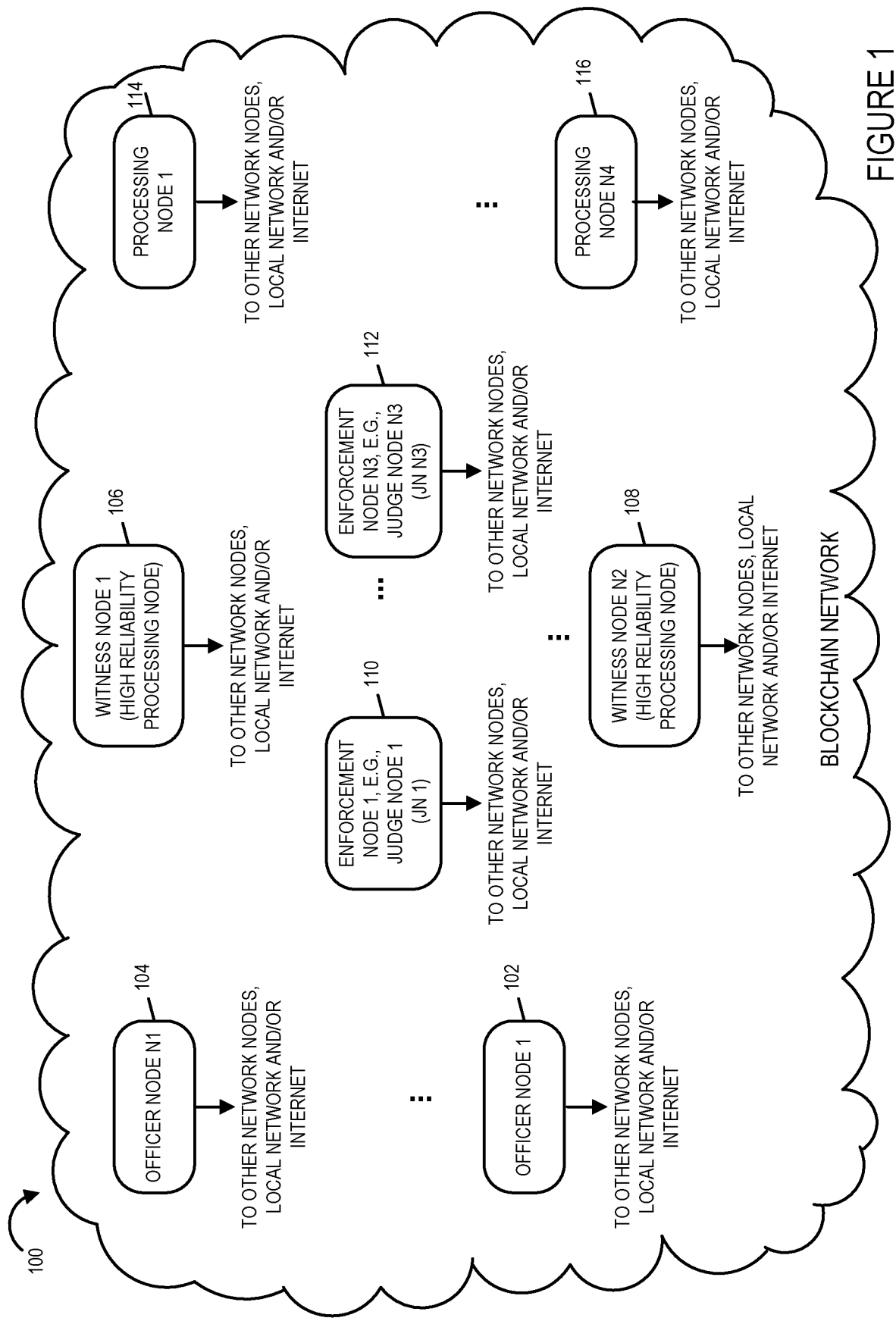
FIG. 1 is a drawing of an exemplary blockchain network in accordance with an exemplary embodiment.

FIG. 1 is a drawing of an exemplary blockchain network 100 in accordance with an exemplary embodiment. Exemplary blockchain network 100 includes a plurality of officer nodes (officer node 1 102, . . . , officer node N1 104), a plurality of witness nodes (witness node 1 106, . . . , witness node N2 108), a plurality of enforcement nodes (enforcement node 1 110, . . . , enforcement node N3 112), and a plurality of processing nodes (processing node 1 114, . . . , processing node N4 116), which are coupled together, e.g., via network links, one or more local networks and/or the Internet. Witness nodes are high reliability processing nodes. Enforcement nodes are sometimes referred to as judge nodes.

Figure 2A:
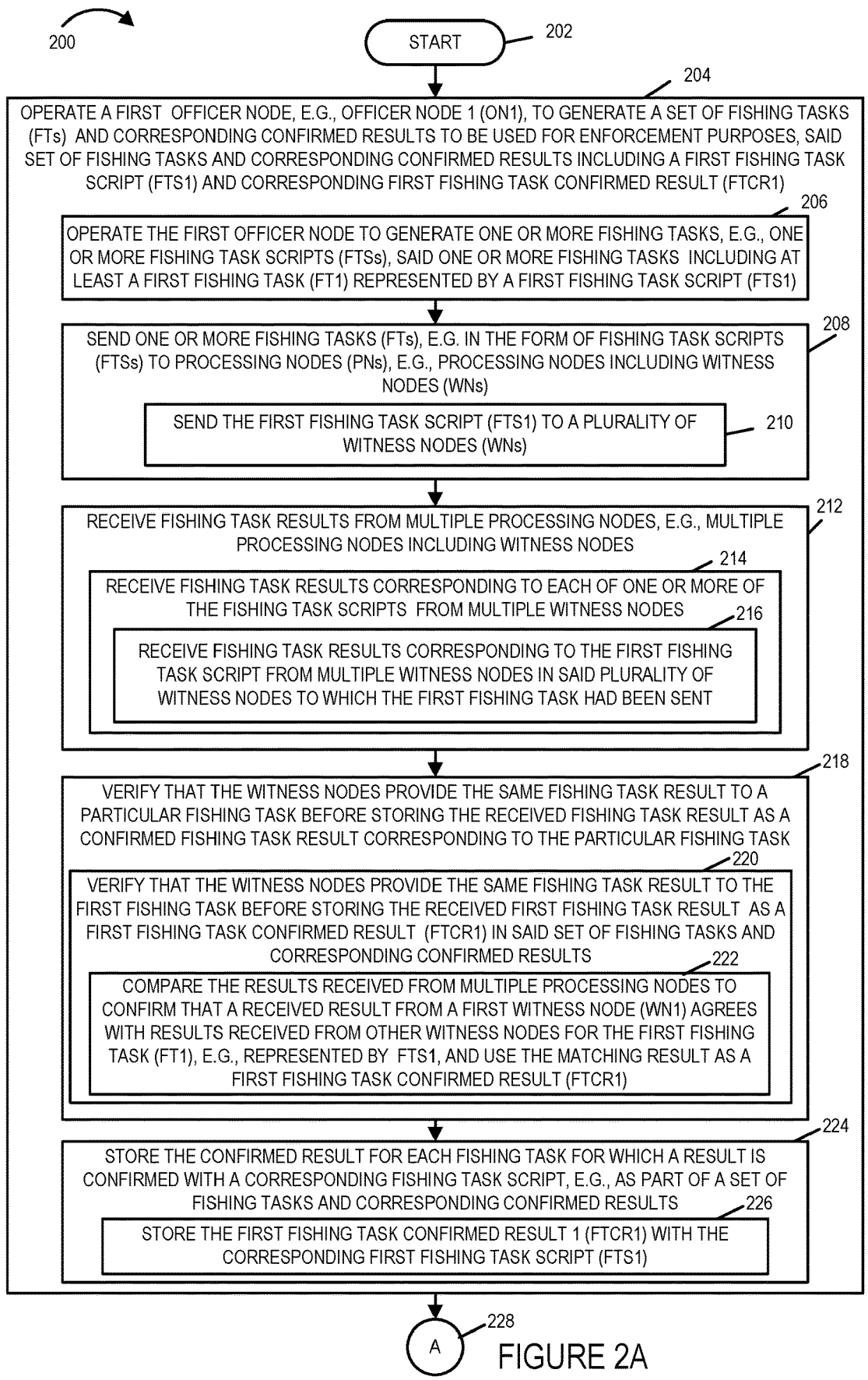
FIG. 2A is first part of a flowchart, of an exemplary method of operating a blockchain network, e.g., blockchain network of FIG. 1, in accordance with an exemplary embodiment.
Figure 2B:
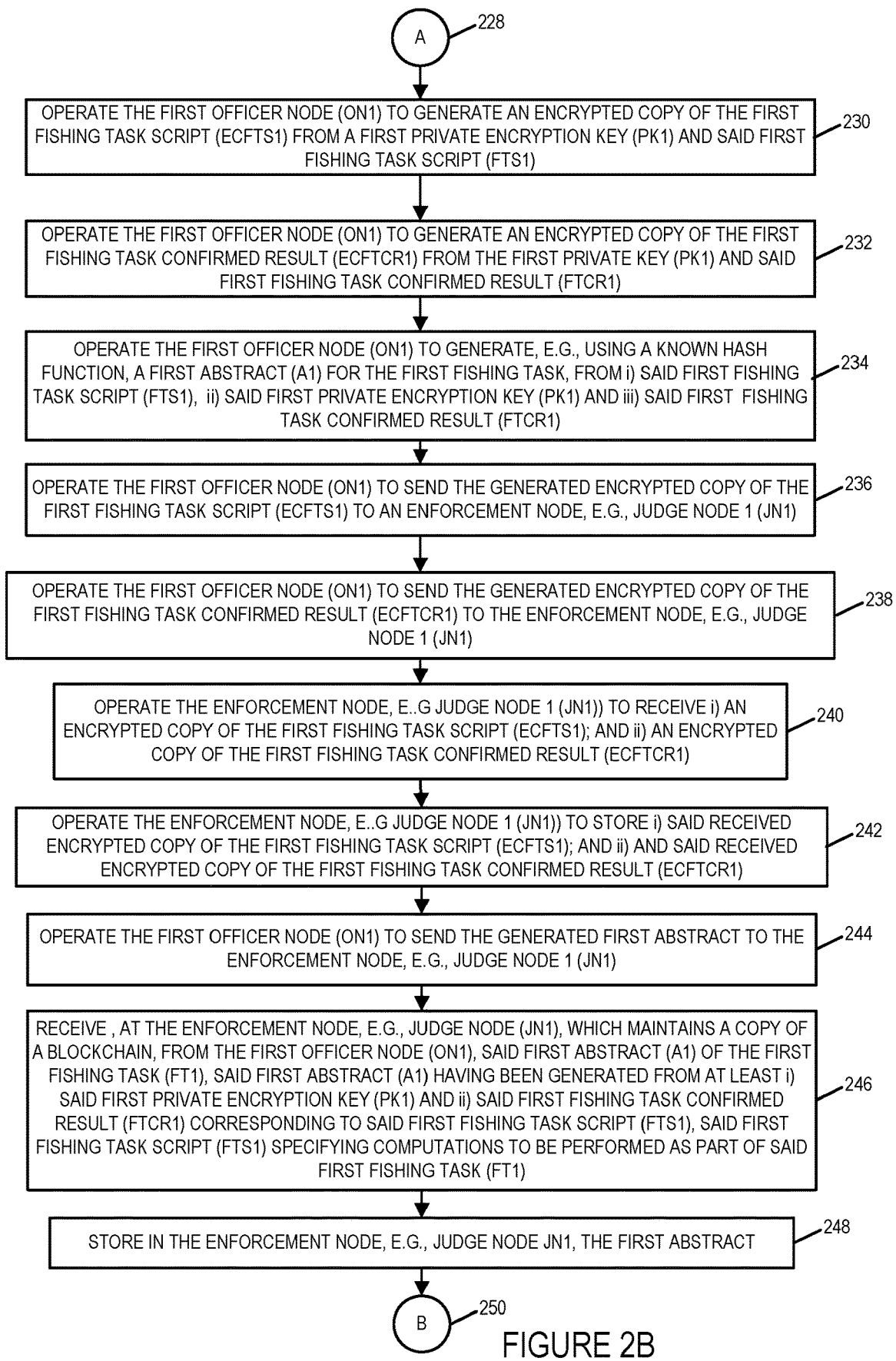
FIG. 2B is second part of a flowchart, of an exemplary method of operating a blockchain network, e.g., blockchain network of FIG. 1, in accordance with an exemplary embodiment.
Figure 2C:
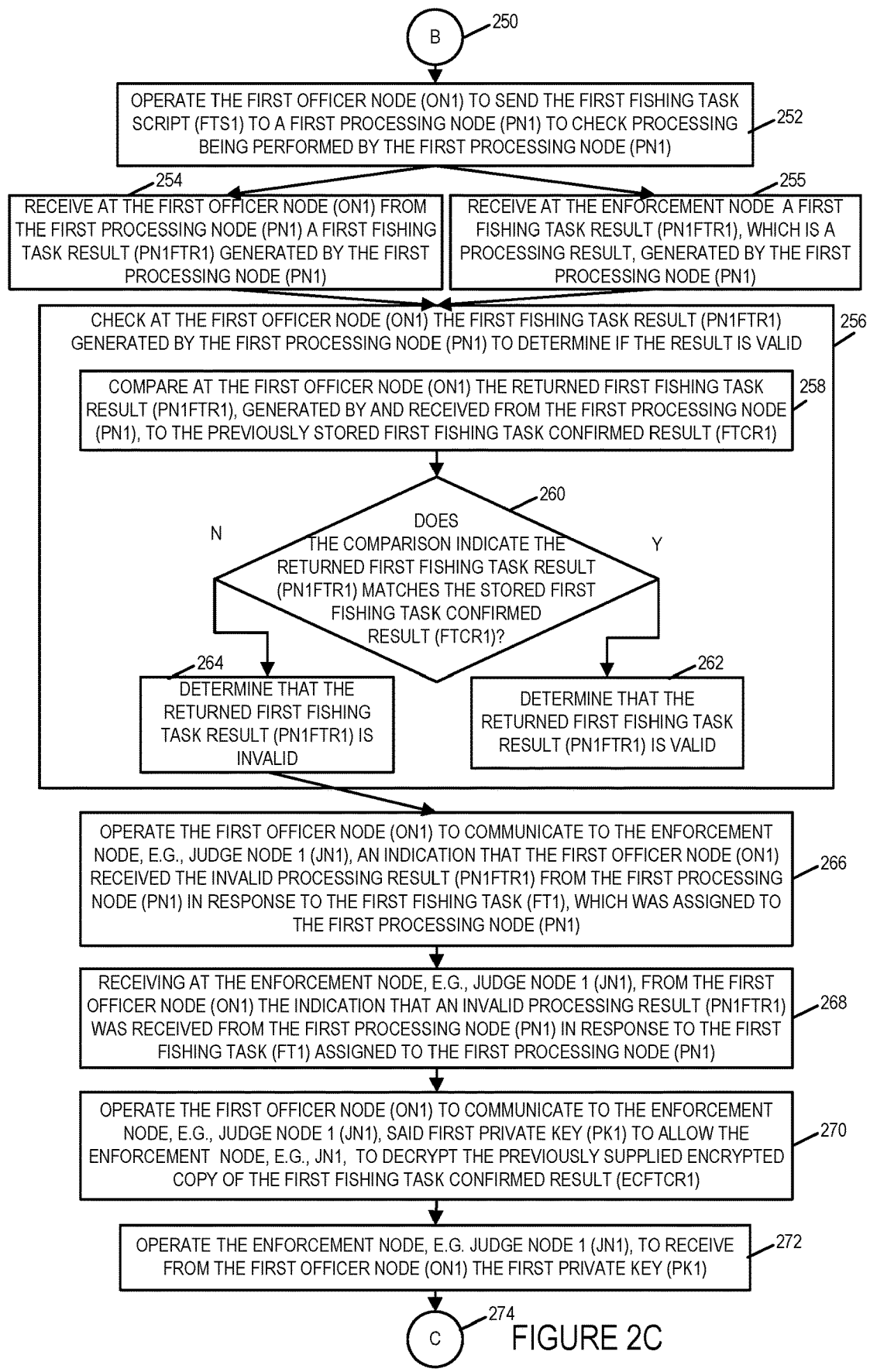
FIG. 2C is third part of a flowchart, of an exemplary method of operating a blockchain network, e.g., blockchain network of FIG. 1, in accordance with an exemplary embodiment.
Figures 2, 2A, 2B, 2C, 2D:
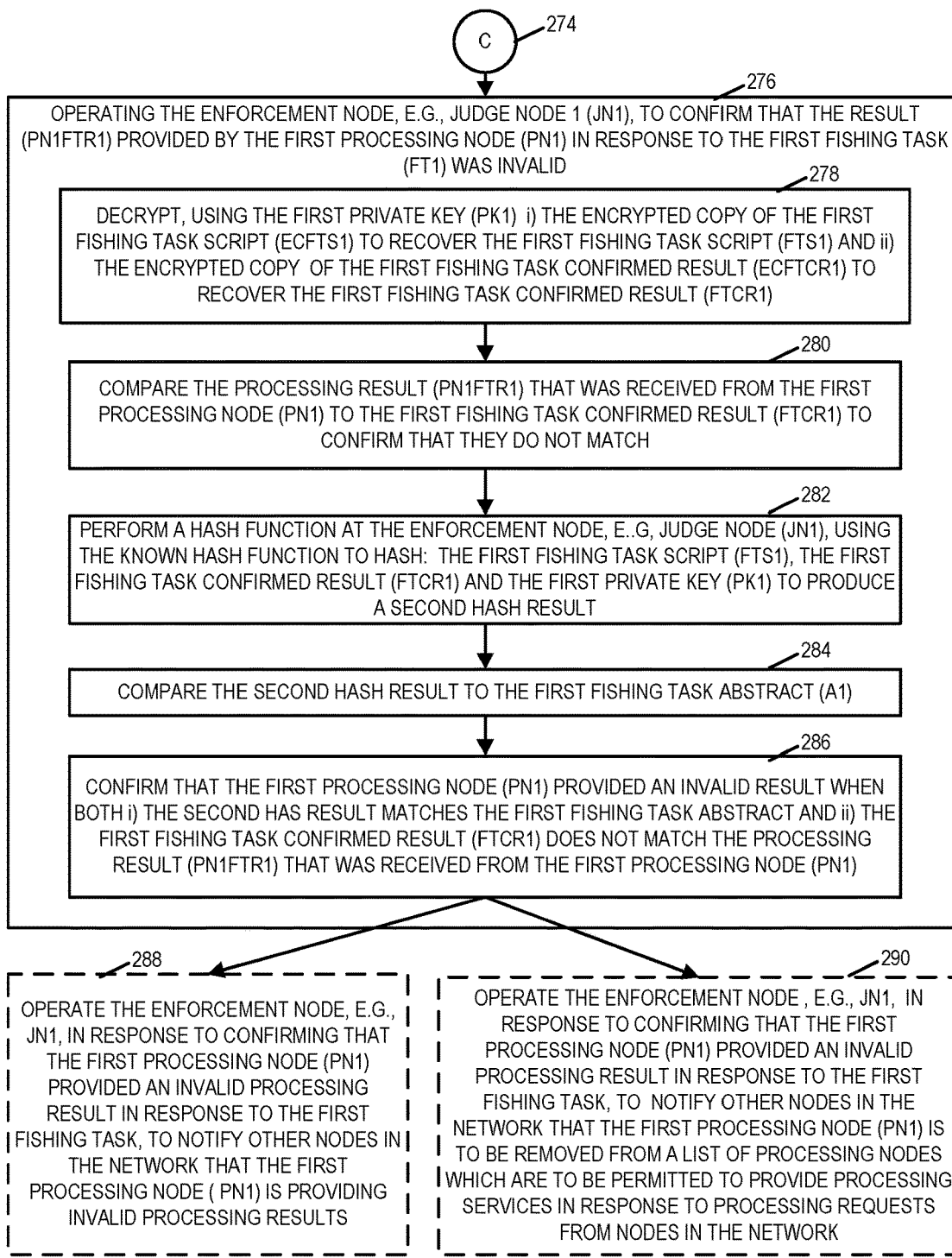
FIG. 2D is fourth part of a flowchart, of an exemplary method of operating a blockchain network, e.g., blockchain network of FIG. 1, in accordance with an exemplary embodiment.
FIG. 2 comprising the combination of FIG. 2A, FIG. 2B, FIG. 2C and FIG. 2D.

FIG. 2, comprising the combination of FIG. 2A, FIG. 2B, FIG. 2C and FIG. 2D, is a flowchart 200, of an exemplary method of operating a blockchain network, e.g., blockchain network 100 of FIG. 1, in accordance with an exemplary embodiment.

Operation of the exemplary method starts in step 202 in which the blockchain network is powered on and initialized. Operation proceeds from step 202 to step 204.

In step 204, a first officer node, e.g., officer node 1 (ON1) 102 of FIG. 1, is operated to generate a set of fishing tasks (FTs) and corresponding confirmed results to be used for enforcement purposes, said set of fishing tasks and corresponding confirmed results including a first fishing task script (FTS1) and corresponding first fishing task confirmed result (FTCR1). Step 204 includes steps 206, 208, 212, 219 and 224.

In step 206 the first officer node generates one or more fishing tasks (FTs), e.g., one or more fishing task scripts (FTs), said one or more fishing tasks including at least a first fishing task (FT1), represented by a first fishing task script (FTS1). Operation proceeds from step 206 to step 208.

In step 208 the first officer node sends one or more fishing tasks (FTs) in the form of fishing task scripts (FTs) to processing nodes (PNs), e.g., processing nodes including witness nodes (WNs). Step 208 includes step 210 in which the first officer node sneds the first firshing task script (FTS1) to a plurality of witness nodes, e.g., WN 1 106 and WN N2 108 of FIG. 1. Operation proceeds from step 208 to step 212.

In step 210 the officer nodes receives fishing task results from multiple processing nodes, e.g. multiple processing nodes including witness nodes. Step 212 include step 214, in which the first officer nodes receives fishing task results corresponding to each of one or more of the fishing task scripts from multiple witness nodes. Step 214 includes step 216 in which the first officer nodes receives fishing task results corresponding to the first fishing task script (FTS1) from multiple witness nodes, e.g., WN 1 106 and WN N2 108, in said plurality of witness nodes to which the first fishing task had been sent. Operation proceeds from step 212 to step 218.

In step 218 the first officer node verifies that the witness nodes provide the same fishing task result to a particular fishing task before storing the received fishing task result as a confirmed fishing task result corresponding to the particular fishing task. Step 218 includes step 220, in which the first officer node verifies that the witness nodes provide the same first task result to the first fishing task before storing the received fishing task result as a confirmed first fishing task result (FTCR1) in said set of fishing tasks and corresponding confirmed results. In some embodiments, the witness nodes are processing nodes which are known to provide reliable processing results, said witness nodes being more reliable than said first processing node (PN1). Step 220 includes step 222.

In step 222, the first officer node compares the results received from multiple processing nodes, e.g., WN 1 106 and WN N2 108, to confirm that a received result from a first witness node, e.g., WN 1 106, agrees with results received from other witness nodes, e.g., WN N2 108, for the first fishing task (FT1), e.g., represented by the first fishing task script (FTS1), and uses the matching result as a first fishing task confirmed result (FTCR1). Operation proceeds from step 218 to step 224.

In step 224 the first officer node stores the confirmed result for each fishing task for which a result is confirmed with a corresponding fishing task script, e.g., as part of a set of fishing tasks and corresponding confirmed results. Step 224 includes step 226, in which the first officer node stores the first fishing task confirmed result (FTCR1) with the corresponding first fishing task script (FTS1). Operation proceeds from step 224, via connecting node A 228, to step 230.

In step 230 the first officer node (ON1) generates an encrypted copy of the first fishing task script (ECFTS1) from a first private encryption key (PK1) and said first fishing task script (FTS1). Operation proceeds from step 230 to step 232.

In step 232 the first officer node (ON1) generates an encrypted copy of the first fishing task confirmed result (ECFTCR1) from the first private encryption key (PK1) and said first fishing task confirmed result (FTCR1). Operation proceeds from step 232 to step 234.

In step 234 the first officer node (ON1) generates, using a known hash function, a first abstract (A1) for the first fishing task, from i) said first fishing task script (FTS1), ii) said first private encryption key (PK1), and iii) said first fishing task confirmed result (FTCR1). In some embodiments, the first abstract (A1) is a proof in the form of a hash sequence generated by the first officer node (ON1) performing a hash of the first fishing task script (FTS1), a first fishing task confirmed result (FTCR1), corresponding to the first fishing task script (FTS1), and a first private key (PK1). In some embodiments, the hash is a predetermined hash function known to the first officer node (ON1) and to the enforcement node (JN1). Operation proceeds from step 234 to step 236.

In step 236 the first officer node (ON1) sends the generated encrypted copy of the first fishing task script (ECFTS1) to an enforcement node, e.g., judge node 1 (JN1), e.g., enforcement node 1 110 of FIG. 1. Operation proceeds from step 236 to step 238.

In step 238 the first officer node (ON1) sends the generated encrypted copy of the first fishing task confirmed result (ECFTCR1) to the enforcement node, e.g., judge node 1 (JN1). Operation proceeds from step 238 to step 240.

In step 240 the enforcement node, e.g., judge node 1 (JN1), receives i) an encrypted copy of the first fishing task script (ECFTS1) and ii) an encrypted copy of the first fishing task confirmed result (ECFTCR1). Operation proceeds from step 240 to step 242.

In step 242 the enforcement node, e.g., judge node 1 (JN1), stores i) said received encrypted copy of the first fishing task script (ECFTS1) and ii) said received encrypted copy of the first fishing task confirmed result (ECFTCR1). Operation proceeds from step 242 to step 244. In some embodiments, the enforcement node (JN1) is a full blockchain node that stores the full set of blokchain information.

In step 244 the first officer node (ON1) sends the generated first abstract (A1) to the enforcement node, e.g., JN1. Operation proceeds from step 244 to step 246.

In step 246, the enforcement node, e.g. JN1, which maintains a copy of the blockchain, receives from the first officer node (ON1), said first abstract (A1) of the first fishing task (FT1), said first abstract (A1) having been generated from at least i) said first private encryption key (PK1), and said first fishing task confirmed result (FTCR1) corresponding to said first fishing task script (FTS1), said first fishing task script (FTS1) specifying computations to be performed as part of the first fishing task. In some embodiments, the first abstract (A1) has been generated from i) said first private encryption key (PK1), ii) said first fishing task script (FTS1) and iii) said first fishing task confirmed result (FTCR1). Operation proceeds from step 246 to step 248.

In step 248 the enforcement node, e.g. JN1, stores the received first abstract (A1). Operation proceeds from step 248, via connecting node B 250, to step 252.

In step 252 the first officer node (ON1) sends the first fishing task script (FTS1) to a first processing node (PN1), e.g., processing node 1 114 of FIG. 1. Operation proceeds from step 252 to step 254 and step 255.

In step 254 the first officer node (ON1) receives from the first processing node (PN1) a first fishing task result (PN1FTR1) generated by the first processing node (PN1). Operation proceeds from step 254 to step 256.

In step 255 the enforcement node receives the first fishing task result (PN1FTR1), which is a processing result, generated by the first processing node (PN1). In some embodiments, the enforcement node receives the processing result (PN1FTR1) returned by the first processing node (PN1) in a broadcast processing result message sent by the first processing node (PN1) to other nodes in the network or from the first officer node (ON1). In some embodiments, the first fishing task processing result (PN1FTR1), generated by processing node PN1 is received in steps 254 and 255 in a broadcast from processing node PN1 to the blockchain. In an embodiment, in which the enforcement node (JN1) receives the processing result (PN1FTR1), generated by first processing node (PN1) from the officer node (ON1) rather than from the first processing node (PN1) step 255 is performed after step 254. Operation proceeds from step 255 to step 256.

In step 256 the first officer node (ON1) checks the first fishing task result (PN1FTR1) generated by the first processing node (PN1) to determine if the result is valid. Step 256 includes steps 258, s60, 262 and 264.

In step 258 the first officer node compares the returned first fishing task result (PN1FTR1), which was generated by and received from the first processing node (PN1), to the previously stored first fishing task confirmed result (FTCR1). Operation proceeds from sep 258 to step 260.

In step 260 the first officer nodes determines if the comparison of step 258 indicates that the returned first fishing task result from the first processing node (PN1FTR1) matches the stored first fishing task confirmed result (FTCR1). If the determination is that the comparison indicates that the returned first fishing task result from the first processing node (PN1FTR1) matches the stored first fishing task confirmed result (FTCR1), then operation proceeds from step 260 to step 262, in which the first officer node determines that the returned first fishing task result (PN1FTR1) is valid. However, if the determination is that the comparison indicates that the returned first fishing task result from the first processing node (PN1FTR1) does not match the stored first fishing task confirmed result (FTCR1), then operation proceeds from step 260 to step 264, in which the first officer node determines that the returned first fishing task result (PN1FTR1) is invalid. Operation proceeds from step 264 to step 266.

In step 266 the first officer node (ON1) communicates to the enforcement node, e.g. JN1, an indication that the first officer node (ON1) received the invalid processing result (PN1FTR1) from the first processing node (PN1) in response to the first fishing task (FT1), represented by first fishing task script (FTS1), which was assigned to the first processing node (PN1). Operation proceeds from step 266 to step 268.

In step 268 the enforcement node, e.g. JN1, receives from the first officer node (ON1), the indication that an invalid processing results (PN1FTR1) was received from the first processing node (PN1) in response to the first fishing task (FT1) assigned to the first processing node (PN1). In some embodiments, the indication that an invalid processing result (PN1FTR1) was received from a first processing node (PN1) in response to the first fishing task (FT1) assigned to the first processing node (PN1) is generated and broadcasted by a smart contract component running on the first officer node. Operation proceeds from step 268 to step 270. A smart contract is a computer code or component, e.g., module, running on a device on top of a blockchain including a set of rules under which the parties to that smart contract agree to interact with each other. If and when the pre-defined rules are met, the agreement is automatically enforced by the smart contract. In some embodiments the smart contract code facilitates, verifies, and enforces the negotiation or performance of an agreement or transaction.

In step 270 the first officer node (ON1) communicates to the enforcement node, e.g. judge node 1 (JN1), said first private key (PK1) to allow the enforcement node, e.g., JN1, to decrypt the previously supplied encrypted copy of the first fishing task confirmed result (ECFTCR1). Operation proceeds from step 270 to step 272.

In step 272, the enforcement node, e.g., JN1, receives from the first officer node the first private key (PK1). In some embodiments, the first private key (PK1) is used to confirm that the result (PN1FTR1) provided by the first processing node (PN1) in response to the first fishing task (FT1), represented by first fishing task script (FTS1), was invalid. Operation proceeds from step 272, via connecting node C 274, to step 276.

In step 276, the enforcement node, e.g. JN1, is operated to confirm that the result (PN1FTR1) provided by the first processing node (PN1) in response to the first fishing task (FT1) was invalid. Step 276 includes steps 278, 280, 282, 284 and 286.

In step 284 the enforcement node decrypts, using the first private key (PK1), i) the encrypted copy of the first fishing task script (ECFTS1) to recover the first fishing task script (FTS1), and ii) the encrypted copy of the first fishing task confirmed r4esult (ECFTCR1) to recover the first fishing task confirmed result (FTCR1). Operation proceeds from step 278 to step 280.

In step 280 the enforcement node compares the processing result (PN1FTR1) that was received from the first processing node (PN1) to the first fishing task confirmed result (FTCR1) to confirm that they do not match. Operation proceeds from step 280 to step 282.

In step 282 the enforcement node performs a hash function at the enforcement node, using the known hash function to hash: the first fishing task script (FTS1), the first fishing task confirmed result (FTCR1) and the first private key (PK1) to produce a second hash result. Operation proceeds from step 282 to step 284.

In step 284 the enforcement node compares the second hash result to the first fishing task abstract (A1), which is a first hash result. Operation proceeds from step 284 to step 286.

In step 286 the enforcement node confirms that the first processing node (PN1) provided and invalid result when both the i) the second hash result matches the first fishing task abstract (A1) and ii) the first fishing task confirmed result (FTCR1) does not match the processing result (PN1FTR1) that was received from the first processing node (PN1). Operation proceeds from step 286 to one or both of steps 288 and 290.

In step 288 the enforcement node, e.g. JN1, in response to confirming that the first processing node (PN1) provided and invalid processing result in response to the first fishing task (FT1), notifies other nodes in the network that the first processing node (PN1) is providing invalid processing results. In step 290 the enforcement node, e.g. JN1, in response to confirming that the first processing node (PN1) provided and invalid processing result in response to the first fishing task (FT1), notifies other nodes in the network that the first processing node (PN1) is to be removed from a list of processing nodes which are permitted to provide processing services in response to processing request from nodes in the network.

Figure 3:
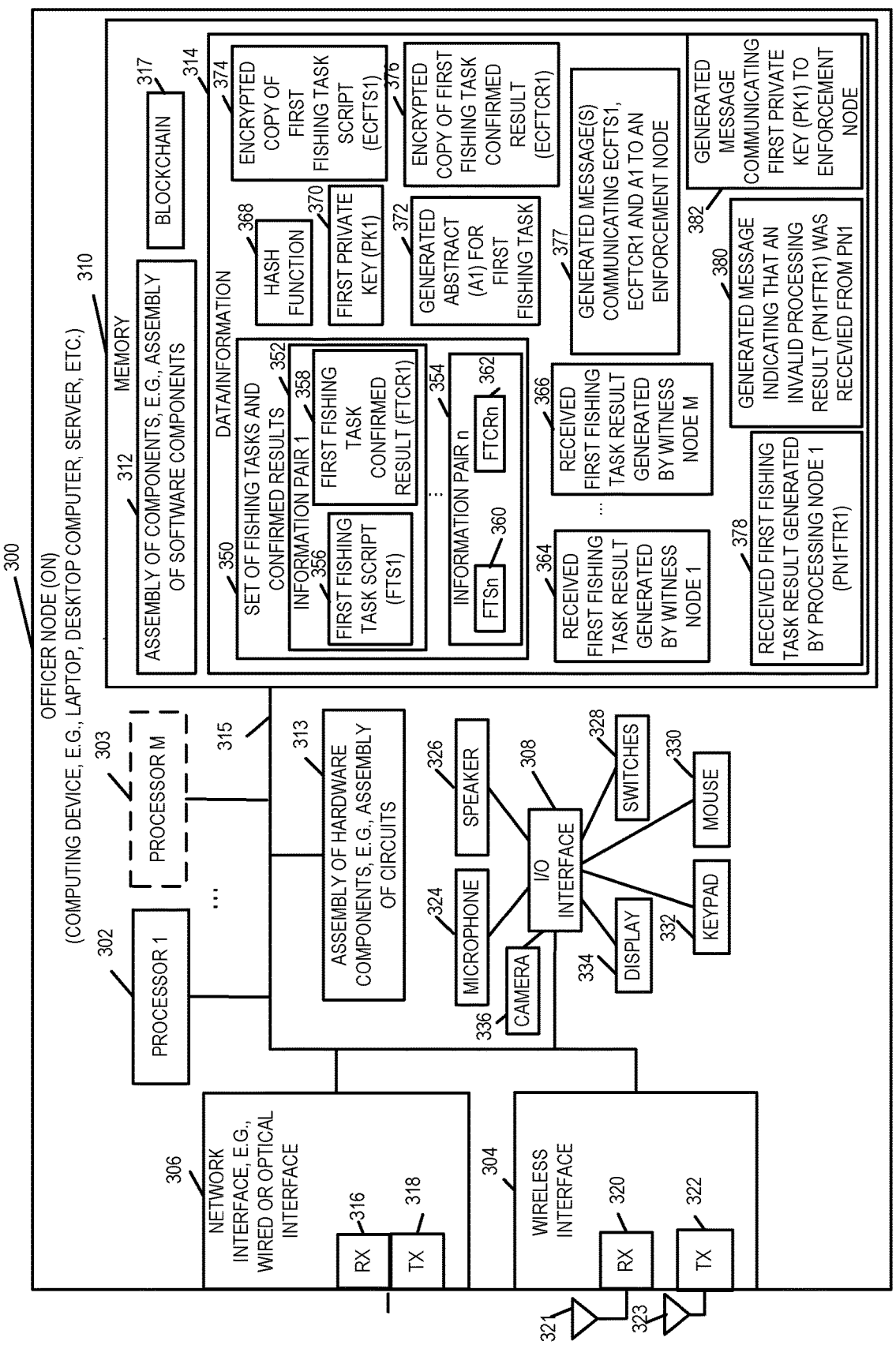
FIG. 3 is a drawing of an exemplary officer node in accordance with an exemplary embodiment.

FIG. 3 is a drawing of an exemplary officer node 300 in accordance with an exemplary embodiment. Exemplary officer node 300, which is a computing device, is, e.g., a server, laptop, desktop computer, notepad computer, etc., in accordance with an exemplary embodiment. Exemplary officer node 300 is, e.g., any of the officer nodes (officer node 1 102, . . . , officer node N1 104) of FIG. 1, and/or an officer node implementing steps of a method 200 of FIG. 2, which are performed by an officer node, e.g. a first officer node.

Officer node 300 includes one or more processors (processor 1 302, . . . , processor M 303), wireless interface 304, network interface 306, e.g., a wired or optical interface, I/O interface 308, memory 310, and an assembly of hardware components 313, e.g., assembly of circuits, coupled together via a bus 315 over which the various elements may interchange data and information. Wireless interface 304 includes a wireless receiver 320 coupled to receive antenna 321, via which the officer node 300 may receive wireless signals from other devices. Wireless interface 304 further includes a wireless transmitter 322 coupled to transmit antenna 323, via which the officer node 300 may transmit wireless signals from other devices. In some embodiments, the same antenna is used for the receiver and transmitter. Network interface 306 includes a receiver 316 via which the officer node 300 may receive signal from other devices, e.g., over a wired backhaul connection. Network interface 306 includes a transmitter 318 via which the officer node 300 may transmit signals to other devices, e.g., over a wired backhaul connection.

Memory 310 includes an assembly of components 312, e.g., an assembly of software components, data/information 314, and a blockchain 317. Officer node 300 further includes a plurality of input/output devices, microphone 324, speaker 326, switches 328, mouse 330, keypad 332, display 334, and camera 336, coupled to I/O interface 308.

Data/information 314 includes a set 350 of fishing tasks and confirmed results. Set 350 includes one or more information pairs (information pair 1 352, . . . , information pair n 354). Information pair 352 includes first fishing task script (FTS1) 356 and corresponding first fishing task confirmed result (FTCR1) 358. Information pair n 355 includes nth fishing task script (FTSn) 360 and corresponding nth fishing task confirmed result (FTCRn) 362.

Data/information 350 further includes received first fishing task results which were generated by witness nodes, which performed computation in accordance with the first fishing task script (FTS1) and returned a result (received first fishing task result generated by witness node 1 364, . . . , received first fishing task result generated by witness node M 366), a hash function 368, which is used to generate abstract A1, a private key (PK1) 372, a generated abstract (A1) 372 for the first fishing task, an encrypted copy of the first fishing task script (ECFTS1) 374, an encrypted copy of the first fishing task confirmed result (ECFTCR1) 376 and a received first fishing task result generated by the first processing node (PN1FTR1). Data/information 314 further includes generated message(s) 377 communicating the encrypted copy of the first fishing task script (ECFTS1), the encrypted copy of the first fishing task confirmed result (ECFTCR1), and the first abstract (A1) to an enforcement node, a received first fishing task result generated by processing node 1 (PN1FTR1) 378, a generated message 380 indicating that an invalid processing result (PN1FTR1) was received from processing node P1 said generated message 380 to be sent to an enforcement node, and a generated message 382 communicating the first private encryption key (PK1) to the enforcement node.

Figure 4A:
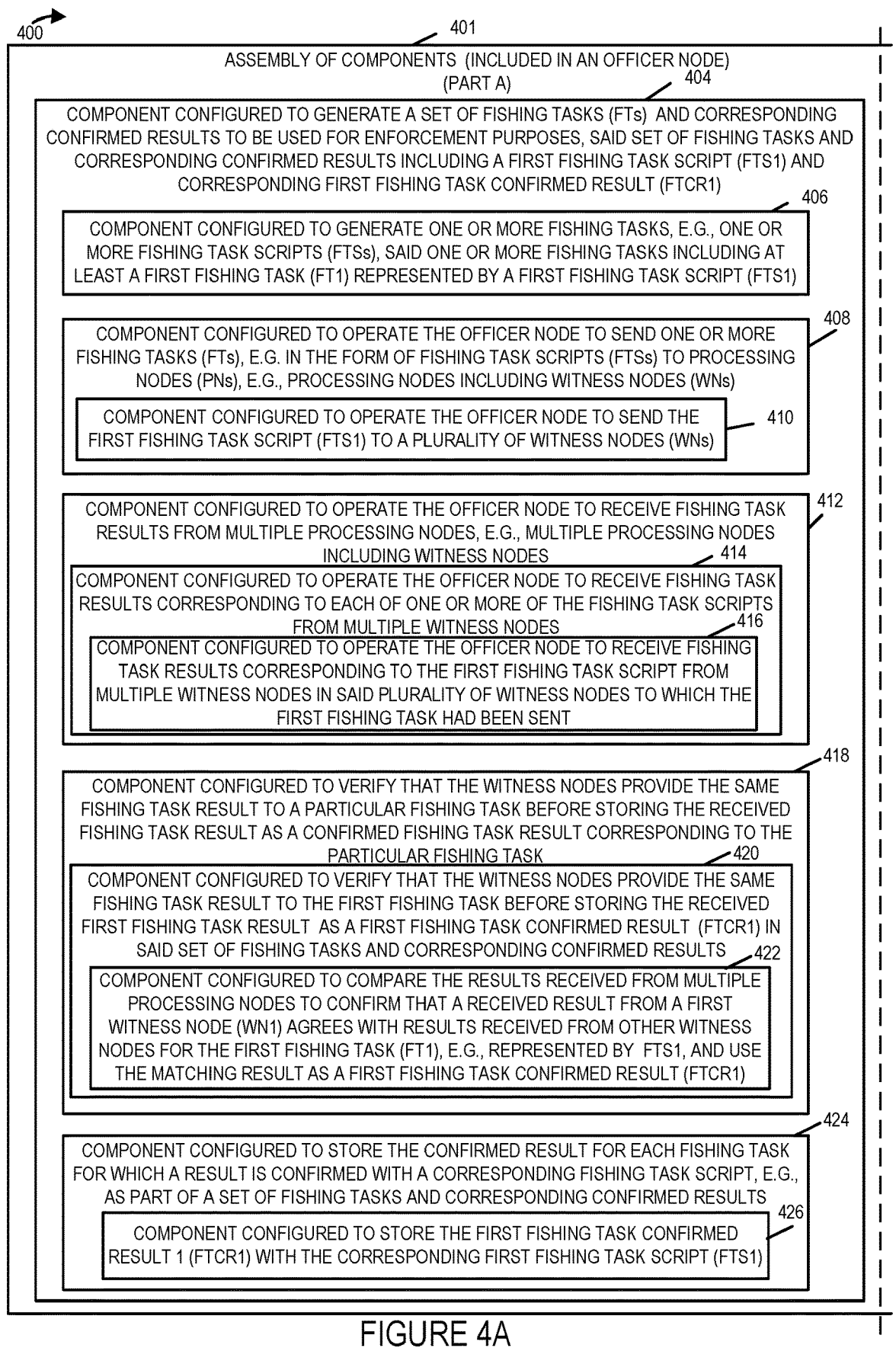
FIG. 4A is a first part of a drawing of an exemplary assembly of components which may be included in an officer node in accordance with an exemplary embodiment.
Figure 4B:
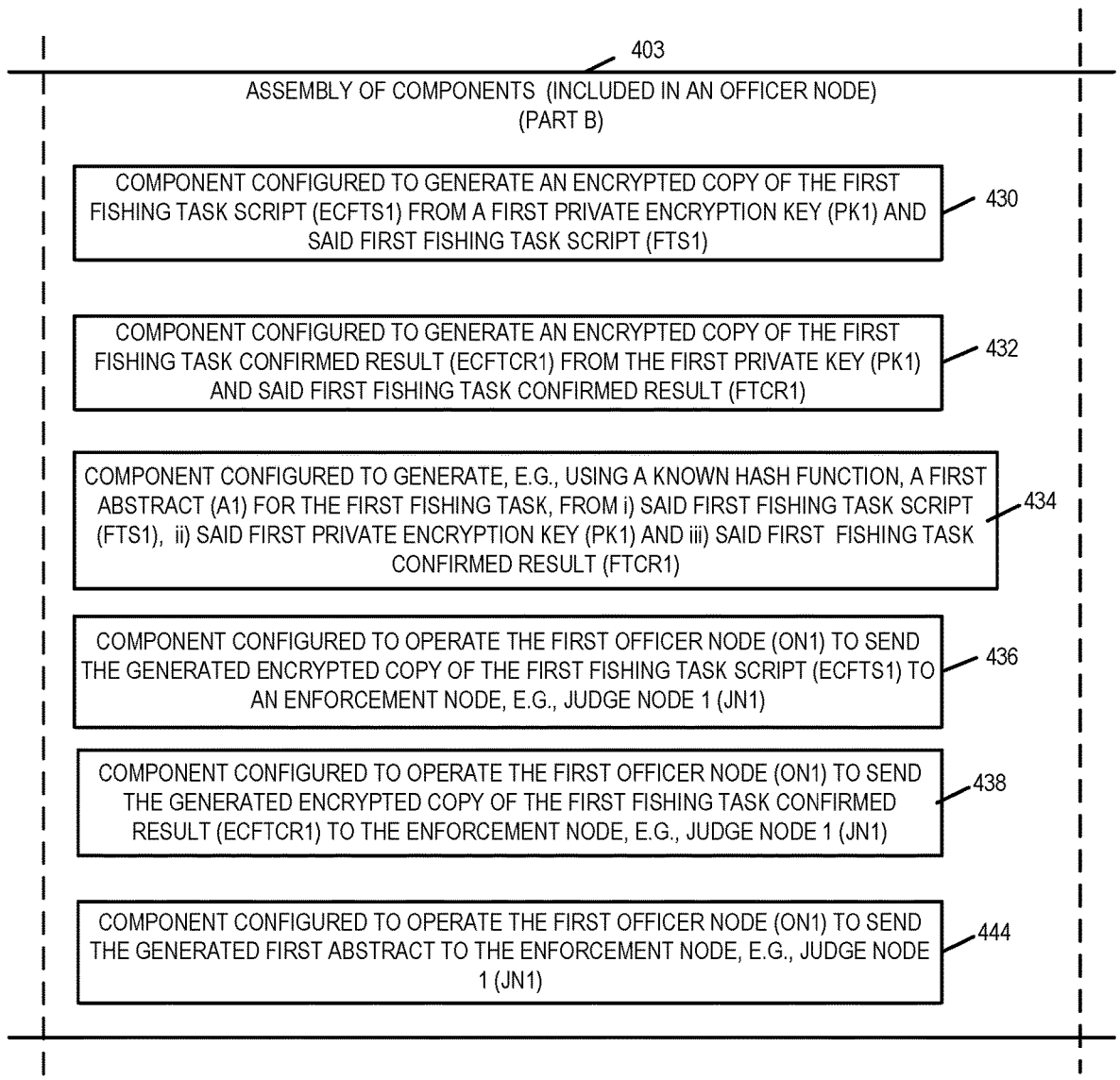
FIG. 4B is a second part of drawing of an exemplary assembly of components which may be included in an officer node in accordance with an exemplary embodiment.
Figures 4, 4C:
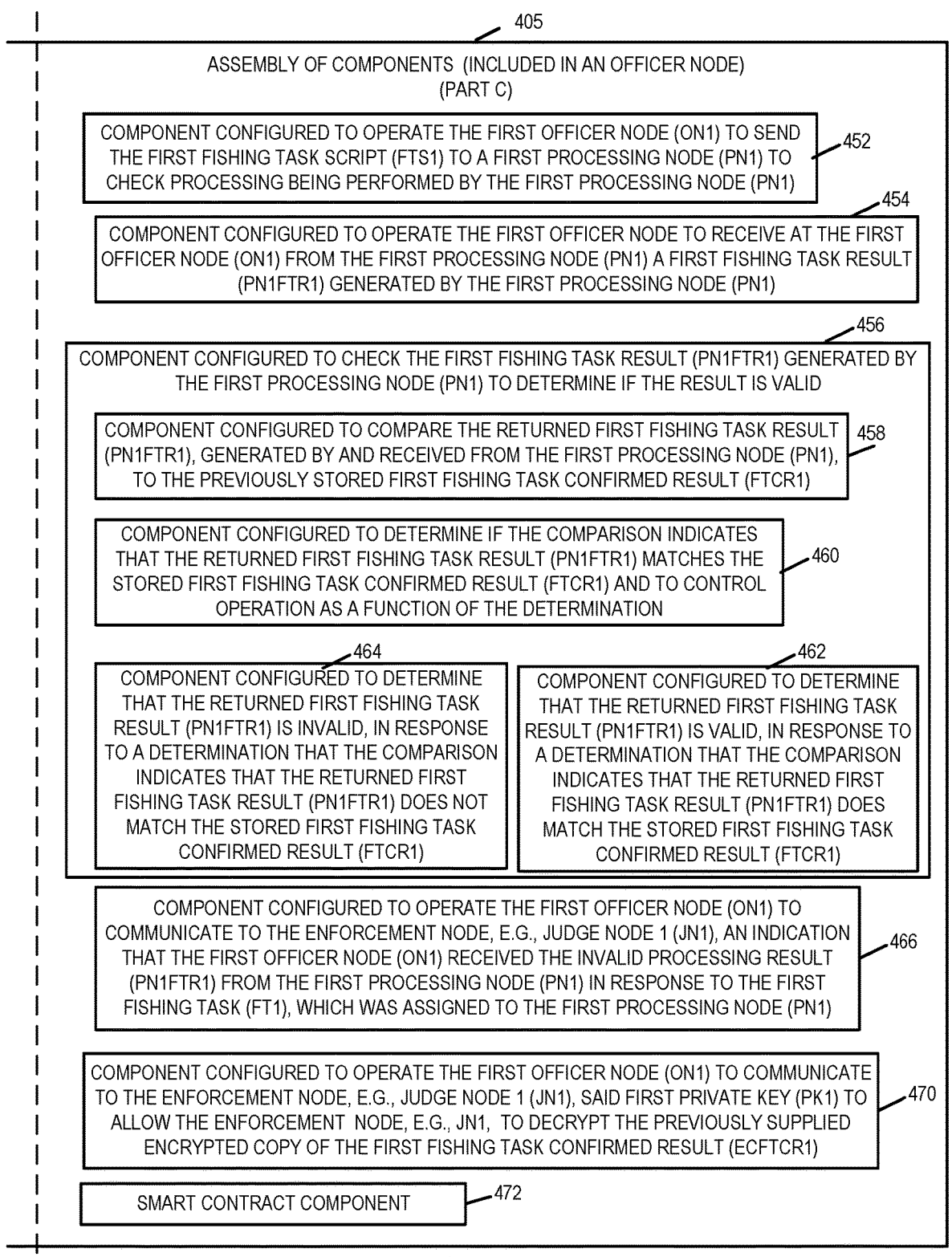
FIG. 4C is a third part of a drawing of an exemplary assembly of components which may be included in an officer node in accordance with an exemplary embodiment.
FIG. 4 comprises the combination of FIG. 4A, FIG. 4B and FIG. 4C.

FIG. 4, comprises the combination of FIG. 4A, FIG. 4B and FIG. 4C, is a drawing of an exemplary assembly of components 400, comprising Part A 401, Part B 403 and Part C 405, which may be including in an officer node in accordance with an exemplary embodiment. Assembly of components 400 is, e.g. included in an officer node, e.g. any of the officer nodes (102, . . . , 104) of FIG. 1, officer node 300 of FIG. 3 and/or an officer node implementing steps of flowchart 200 of FIG. 2, which are performed by an officer node, e.g. the first officer node.

Assembly of components 400 can be, and in some embodiments is, used in officer node 300 of FIG. 3. The components in the assembly of components 400 can, and in some embodiments are, implemented fully in hardware within the processor 302, e.g., as individual circuits. The components in the assembly of components 300 can be, and in some embodiments are, implemented fully in hardware within the assembly of components 313, e.g., as individual circuits corresponding to the different components. In other embodiments some of the components are implemented, e.g., as circuits, within the processor 302 with other components being implemented, e.g., as circuits within assembly of components 313, external to and coupled to the processor 302. As should be appreciated the level of integration of components on the processor and/or with some components being external to the processor may be one of design choice. Alternatively, rather than being implemented as circuits, all or some of the components may be implemented in software and stored in the memory 310 of the officer node 300, with the components controlling operation of the officer node 300 to implement the functions corresponding to the components when the components are executed by a processor, e.g., processor 302. In some such embodiments, the assembly of components 400 is included in the memory 310 as assembly of components 312. In still other embodiments, various components in assembly of components 400 are implemented as a combination of hardware and software, e.g., with another circuit external to the processor providing input to the processor 302 which then under software control operates to perform a portion of a component's function. While processor 302 is shown in the FIG. 3 embodiment as a single processor, e.g., computer, it should be appreciated that the processor 302 may be implemented as one or more processors, e.g., computers. In embodiments, officer node 300 includes multiple processors, e.g. processor 302 and processor M 303.

When implemented in software the components include code, which when executed by the processor 302, configure the processor 302 to implement the function corresponding to the component. In embodiments where the assembly of components 400 is stored in the memory 310, the memory 310 is a computer program product comprising a computer readable medium comprising code, e.g., individual code for each component, for causing at least one computer, e.g., processor 302, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 4 control and/or configure the officer node 300, or elements therein such as the processor 302, to perform the functions of corresponding steps illustrated and/or described in the method of one or more of the flowcharts, signaling diagrams and/or described with respect to any of the Figures. Thus the assembly of components 400 includes various components that perform functions of corresponding one or more described and/or illustrated steps of an exemplary method, e.g., steps of the method of flowchart 200 of FIG. 2, e.g., with respect to steps performed by an officer node, and/or described or shown with respect to any of the other figures.

Assembly of components 400 includes a component 404 configured to generate a set of fishing tasks (FTs) and corresponding confirmed results to be used for enforcement purposes, said set of fishing tasks and corresponding confirmed results includes a first fishing task script (FTS1) and corresponding first fishing task confirmed result (FTCR1). Component 404 includes component 406, component 408, component 412, component 418 and component 424. Component 406 is a component configured to generate one more fishing tasks, e.g., one or more fishing task scripts (FTSs), said one or more fishing tasks including at least a first fishing task (FT1) represented by a first fishing task script (FTS1). Component 408 is a component configured to operate an officer node, e.g. the first officer node, to send one or more fishing tasks (FTs), e.g., in the form of fishing task scripts (FTs) to processing nodes (PNs), e.g., multiple processing nodes including witness nodes (WNs). Component 408 includes a component 410 configured to operate the officer node, e.g. the first officer node, to send the first fishing task script (FTS1) to a plurality of witness nodes (WNs).

Component 412 is a component configured to operate the officer node, e.g. the first officer node, to receive fishing task results from multiple processing nodes, e.g., multiple processing nodes including witness nodes. Component 412 includes a component 414 configured to operate the officer node, e.g., the first officer node, to received fishing task results corresponding to each of one or more fishing task scripts from multiple witness nodes. Component 414 includes a component 416 configured to operate the officer node, e.g., the first officer node, to receive fishing task results corresponding to the first fishing task script from multiple witness nodes in said plurality of witness nodes to which the first fishing task had been sent.

Component 418 is a component configured to verify that the witness nodes provide the same fishing task result to a particular fishing task before storing the received fishing task result as a confirmed fishing task result corresponding to the particular fishing task. Component 418 includes a component 420 configured to verify that the witness nodes provide the same fishing task result to the first fishing task before storing the received fishing task result as a first fishing task confirmed result (FTCR1) in said set of fishing tasks and corresponding confirmed results. Component 420 includes a component 422 configured to compare the results received from multiple processing nodes to confirm that a received result from a first witness node (WN1) agrees with results received from other witness nodes for the first fishing task (FT1), e.g., represented by FTS1, and use the matching result as a first fishing task confirmed result (FTCR1).

Component 424 is a component configured to store the confirmed result for each fishing task for which a result is confirmed with a corresponding fishing task script, e.g., as part of set of fishing tasks and corresponding confirmed results. Component 424 includes a component 426 configured to store the first fishing task confirmed result (FTCR1) with the corresponding first fishing task script (FTS1), e.g., in memory of the officer node, e.g. first officer node.

Assembly of components 400 further includes a component 430 configured to generate an encrypted copy of the first fishing task script (ECFTS1) from a first private encryption key (PK1) and said first fishing task script (FTS1), and a component 432 configured to generate and encrypted copy of the first fishing task confirmed result (ECFTCR1) from the first private encryption key (PK1) and said first fishing task confirmed result (FTCR1). Component 400 further includes a component 434 configured to generate, e.g. using a known hash function, a first abstract (A1) for the first fishing task, from i) said first fishing task script (FTS1), ii) the first private encryption key (PK1), and iii) said first fishing task confirmed result (FTCR1).

Assembly of components 400 further includes a component 436 configured to operate the first officer node to send the generated encrypted copy of the first fishing task script (ECFTS1) to an enforcement node, e.g., judge node 1 (JN1). The first enforcement node is, e.g., enforcement node 1 110, e.g., judge node 1 (JN1) of system 100 of FIG. 1. Assembly of component 400 further includes a component 438 configured to operate the first officer node to send the generated encrypted copy of the first fishing task confirmed result (ECFTCR1) to the enforcement node, e.g., judge node 1 (JN1), and a component 444 configured to operate the first officer node to send the generated first abstract (A1) to the enforcement node, e.g., judge node 1 (JN1).

Assembly of components 400 further includes a component 452 to operate the first officer node to send the first fishing task script (FTS1) to a first processing node (PN1), e.g., processing node 1 114 of FIG. 1, to check processing being performed by the first processing node (PN1), and a component 454 configured to operate the first officer node to receive at the first officer node from the first processing node a first fishing task result (PN1FTR1) generated by the first processing node (PN1).

Assembly of components 400 further includes a component 456 configured to check the first fishing task result (PN1FTR1) generated by the first processing node (PN) to determine if the result is valid. Component 456 includes a component 458 configured to compare the returned first fishing task result (PN1FTR1), generated by and received from the first processing node (PN1), to the previously stored first fishing task confirmed result (FTCR1), and a component 460 configured to determine if the comparison indicates that the returned first fishing task result (PN1FTR1) matches the stored first fishing task confirmed result (FTCR1) and to control operation as a function of the determination. Component 456 further includes a component 462 configured to determine that the returned first fishing task result (PN1FTR1) is valid, in response to a determination that the comparison indicates that the returned first fishing task result (PN1FTR1) does match the stored first fishing task confirmed result (FTCR1) and a component 464 configured to determine that the returned first fishing task result (PN1FTR1) is invalid, in response to a determination that the comparison indicates that the returned first fishing task result (PN1FTR1) does not match the stored first fishing task confirmed result (FTCR1).

Assembly of components 400 further includes a component 466 configured to operate the first officer node to communicate to the enforcement node, e.g. judge node 1 (JN1), an indication that the first officer node received an invalid processing result (PN1FTR1) from the first processing node (PN1) in response to the first fishing task (FT1), e.g., represented by FTS1, which was assigned to the first processing node (PN1), and a component 470 configured to operate the first officer node to communicate to the enforcement node, e.g., judge node 1 (JN1), said first private key (PK1) to allow the enforcement node, e.g. JN1, to decrypt the previously supplied encrypted copy of the first fishing task confirmed result (ECFTCR1), and in some embodiments, to decrypt the previously supplied encrypted copy of the first fishing task script (ECFTS1).

Assembly of components 400 further includes a smart contract component 472. In some embodiment, an indication that an invalid processing result (PN1R1) was received from a first processing node (PN1) is generated and broadcasted by smart contract component 472 running on the first officer node (ON1).

Figure 5:
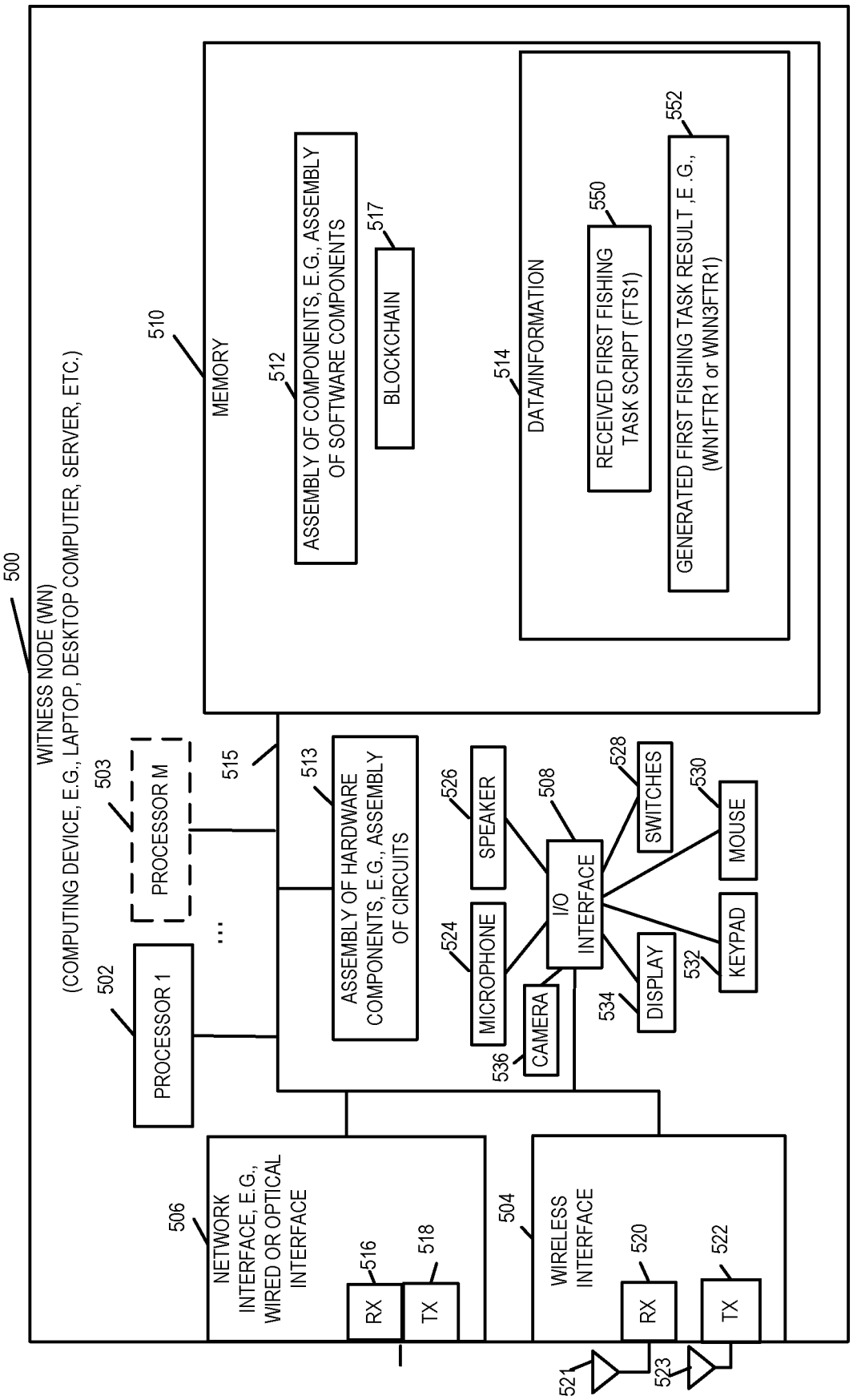
FIG. 5 is a drawing of an exemplary witness node, e.g., a high reliability processing node, in accordance with an exemplary embodiment.

FIG. 5 is a drawing of an exemplary witness node (WN) 500, e.g., a high reliability processing node, in accordance with an exemplary embodiment. Exemplary witness node 500, which is a computing device, is, e.g., a server, laptop, desktop computer, notepad computer, etc., in accordance with an exemplary embodiment. Exemplary witness node 500 is, e.g., any of the witness nodes (witness node 1 106, . . . , officer node N2 106) of FIG. 1, and/or a witness node implementing steps of a method 200 of FIG. 2, which are performed by an witness node and/or which are described with respect to FIG. 2.

Witness node 500 includes one or more processors (processor 1 502, . . . , processor M 503), wireless interface 504, network interface 506, e.g., a wired or optical interface, I/O interface 508, memory 510, and an assembly of hardware components 513, e.g., assembly of circuits, coupled together via a bus 515 over which the various elements may interchange data and information. Wireless interface 504 includes a wireless receiver 520 coupled to receive antenna 521, via which the witness node 500 may receive wireless signals from other devices. Wireless interface 504 further includes a wireless transmitter 522 coupled to transmit antenna 523, via which the witness node 500 may transmit wireless signals from other devices. In some embodiments, the same antenna is used for the receiver and transmitter. Network interface 506 includes a receiver 516 via which the witness node 500 may receive signals from other devices, e.g., over a wired backhaul connection. Network interface 506 includes a transmitter 518 via which the witness node 500 may transmit signals to other devices, e.g., over a wired backhaul connection.

Memory 510 includes an assembly of components 512, e.g., an assembly of software components, data/information 514, and a blockchain 517. Witness node 500 further includes a plurality of input/output devices, microphone 524, speaker 526, switches 528, mouse 530, keypad 532, display 534, and camera 536, coupled to I/O interface 508. Data/information 514 includes a received first fishing task script (FTS1) 550 and a generated first fishing task result 552, e.g., WN1FTR1 or WNN3FTR1.

Figure 6:
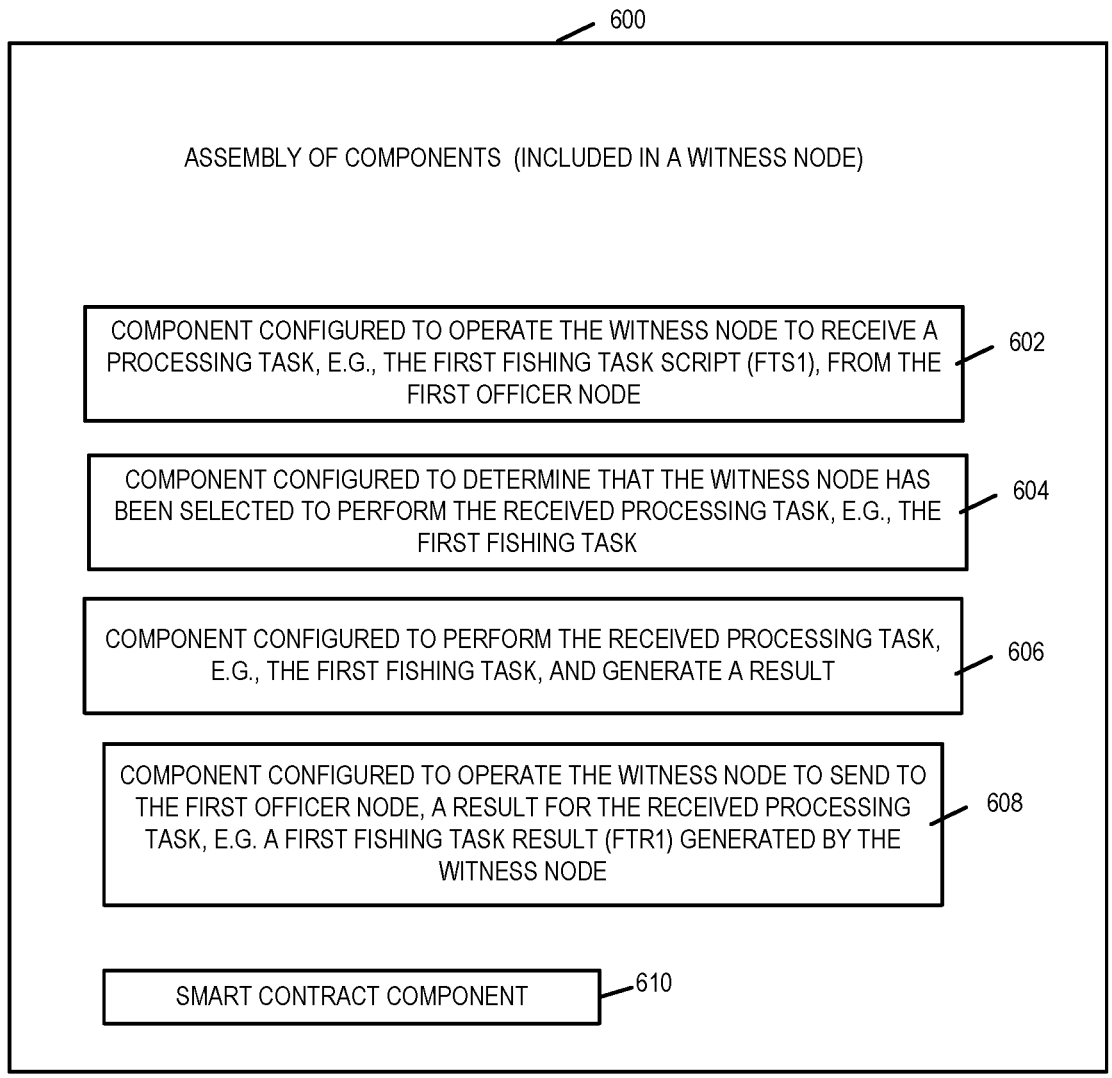
FIG. 6 is a drawing of an exemplary assembly of components which may be included in a witness node in accordance with an exemplary embodiment.

FIG. 6 is a drawing of an exemplary assembly of components 600 which may be included in a witness node in accordance with an exemplary embodiment. Assembly of components 600 is, e.g. included in a witness node, e.g. any of the witness nodes (106, . . . , 108) of FIG. 1, witness node 500 of FIG. 5 and/or an witness node implementing steps of flowchart 200 of FIG. 2, which are performed by a witness node, and/or operations described with respect to FIG. 2 which are performed by a witness node.

Assembly of components 600 can be, and in some embodiments is, used in witness node 500 of FIG. 5. The components in the assembly of components 600 can, and in some embodiments are, implemented fully in hardware within the processor 502, e.g., as individual circuits. The components in the assembly of components 600 can be, and in some embodiments are, implemented fully in hardware within the assembly of components 513, e.g., as individual circuits corresponding to the different components. In other embodiments some of the components are implemented, e.g., as circuits, within the processor 502 with other components being implemented, e.g., as circuits within assembly of components 513, external to and coupled to the processor 502. As should be appreciated the level of integration of components on the processor and/or with some components being external to the processor may be one of design choice. Alternatively, rather than being implemented as circuits, all or some of the components may be implemented in software and stored in the memory 510 of the witness node 500, with the components controlling operation of the witness node 500 to implement the functions corresponding to the components when the components are executed by a processor, e.g., processor 502. In some such embodiments, the assembly of components 600 is included in the memory 510 as assembly of components 512. In still other embodiments, various components in assembly of components 600 are implemented as a combination of hardware and software, e.g., with another circuit external to the processor providing input to the processor 502 which then under software control operates to perform a portion of a component's function. While processor 502 is shown in the FIG. 5 embodiment as a single processor, e.g., computer, it should be appreciated that the processor 502 may be implemented as one or more processors, e.g., computers. In embodiments, witness node 500 includes multiple processors, e.g. processor 502 and processor M 503.

When implemented in software the components include code, which when executed by the processor 502, configure the processor 502 to implement the function corresponding to the component. In embodiments where the assembly of components 600 is stored in the memory 510, the memory 510 is a computer program product comprising a computer readable medium comprising code, e.g., individual code for each component, for causing at least one computer, e.g., processor 502, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 6 control and/or configure the witness node 500, or elements therein such as the processor 502, to perform the functions of corresponding steps illustrated and/or described in the method of one or more of the flowcharts, signaling diagrams and/or described with respect to any of the Figures. Thus the assembly of components 600 includes various components that perform functions of corresponding one or more described and/or illustrated steps of an exemplary method, e.g., steps of the method of flowchart 200 of FIG. 2, e.g., with respect to steps performed by a witness node, and/or described or shown with respect to any of the other figures.

Assembly of components 600 includes a component 602 configured to operate a witness node to receive a processing task, e.g., the first fishing task script (FTS1) from an officer node, e.g. the first officer node, a component 604 configured to determine that the witness node has been selected to perform the received processing task, e.g. the first fishing task, a component 606 configured to perform the received first processing task, e.g. the first fishing task, e.g., perform processing computations in accordance with the first fishing task script (FTS1), and generate a result, and a component 608 configured to operate the witness node to send the first officer node, a result for the received processing task, e.g. a first fishing task result (FTR1) generated by the witness node. For example, if the witness node is WN1, the generated and communicated result, corresponding to first fishing task script (FTS1), may be, and sometime is referred to as WN1FTR1. Assembly of components 600 further includes a smart contract component 610.

Figure 7:
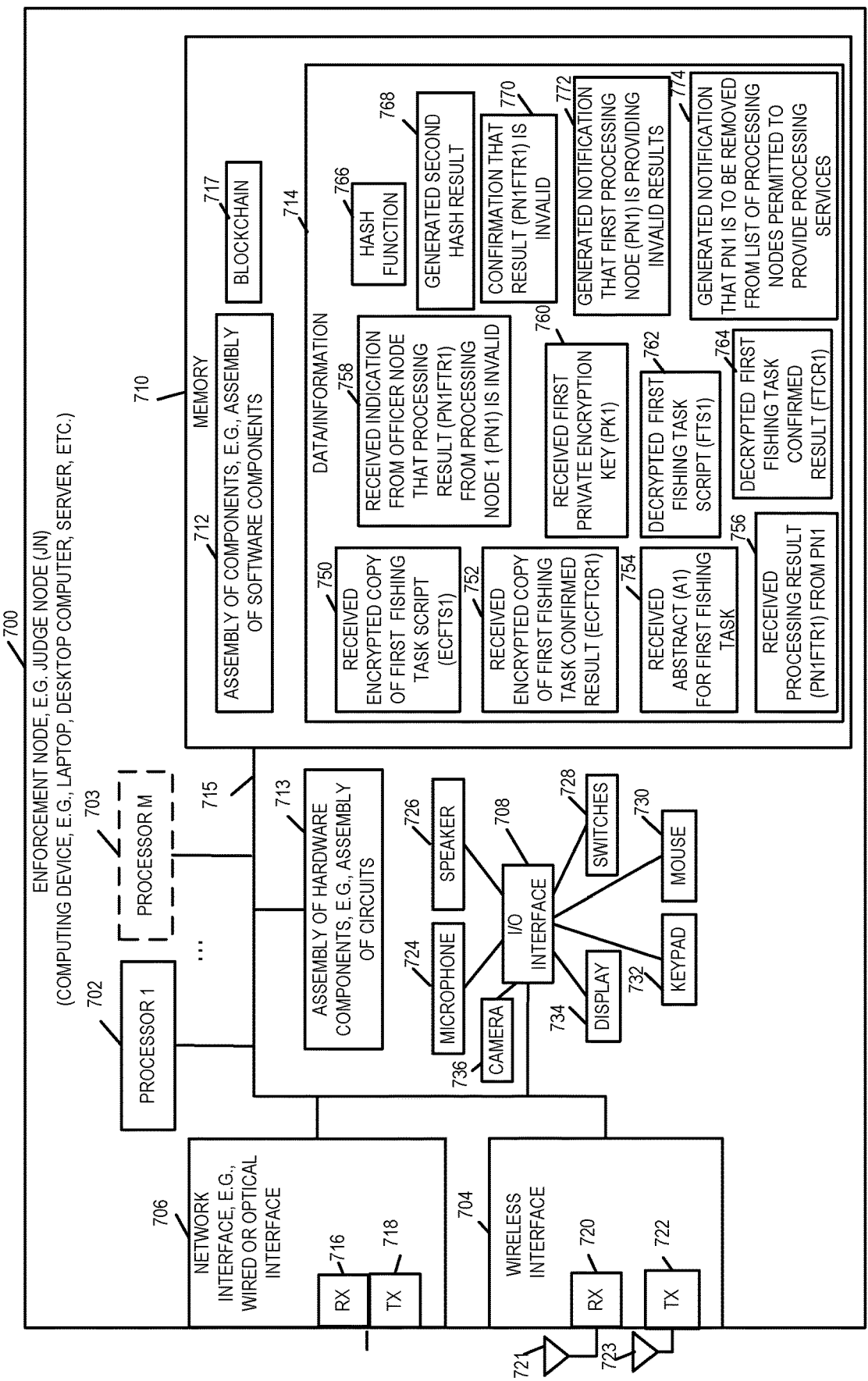
FIG. 7 is a drawing of an exemplary enforcement node, e.g., a judge node, in accordance with an exemplary embodiment.

FIG. 7 is a drawing of an exemplary enforcement node 700, e.g., a judge node (JN), in accordance with an exemplary embodiment. Exemplary enforcement node 700, which is a computing device, is, e.g., a server, laptop, desktop computer, notepad computer, etc., in accordance with an exemplary embodiment. Exemplary enforcement node 700 is, e.g., any of the enforcement nodes (enforcement node 1 110, . . . , enforcement node N3 112) of FIG. 1, and/or an enforcement node implementing steps of a method 200 of FIG. 2, which are performed by an enforcement node, e.g. a first enforcement node, e.g. judge node 1 (JN1).

Enforcement node 700 includes one or more processors (processor 1 702, . . . , processor M 703), wireless interface 704, network interface 706, e.g., a wired or optical interface, I/O interface 708, memory 710, and an assembly of hardware components 713, e.g., assembly of circuits, coupled together via a bus 715 over which the various elements may interchange data and information. Wireless interface 704 includes a wireless receiver 720 coupled to receive antenna 721, via which the enforcement node 700 may receive wireless signals from other devices. Wireless interface 704 further includes a wireless transmitter 722 coupled to transmit antenna 723, via which the enforcement node 700 may transmit wireless signals from other devices. In some embodiments, the same antenna is used for the receiver and transmitter. Network interface 706 includes a receiver 716 via which the enforcement node 700 may receive signal from other devices, e.g., over a wired backhaul connection. Network interface 706 includes a transmitter 718 via which the enforcement node 700 may transmit signals to other devices, e.g., over a wired backhaul connection.

Memory 710 includes an assembly of components 712, e.g., an assembly of software components, data/information 714, and a blockchain 717. Enforcement node 700 further includes a plurality of input/output devices, microphone 724, speaker 726, switches 728, mouse 730, keypad 732, display 734, and camera 736, coupled to I/O interface 708.

Data/information 714 includes a received encrypted copy of the first fishing task script (ECFTS1) 750, a received encrypted copy of the first fishing task confirmed result (ECFTCR1) 752, a received abstract (A1) for the first fishing task 754, which is a first hash result, a received processing result for the first fishing task from processing node P1 (PN1FTR1) 756, a received indication from an officer node that processing result (PN1FTR1) from processing node P1 is invalid 758, a receive first private encryption key (PK1) 760, a decrypted first fishing task script (FTS1) 762, a decrypted first fishing task confirmed result (FTCR1) 764, a hash function 766, e.g., which is the same as hash function 368, a generated second hash result 768, a confirmation result confirming that result PN1FTR1 is invalid 770, a generated notification that processing node PN1 is providing invalid results 772 and a generated notification that processing node P1 is to be removed from a list of processing nodes permitted to provide processing services 774.

Figure 8A:
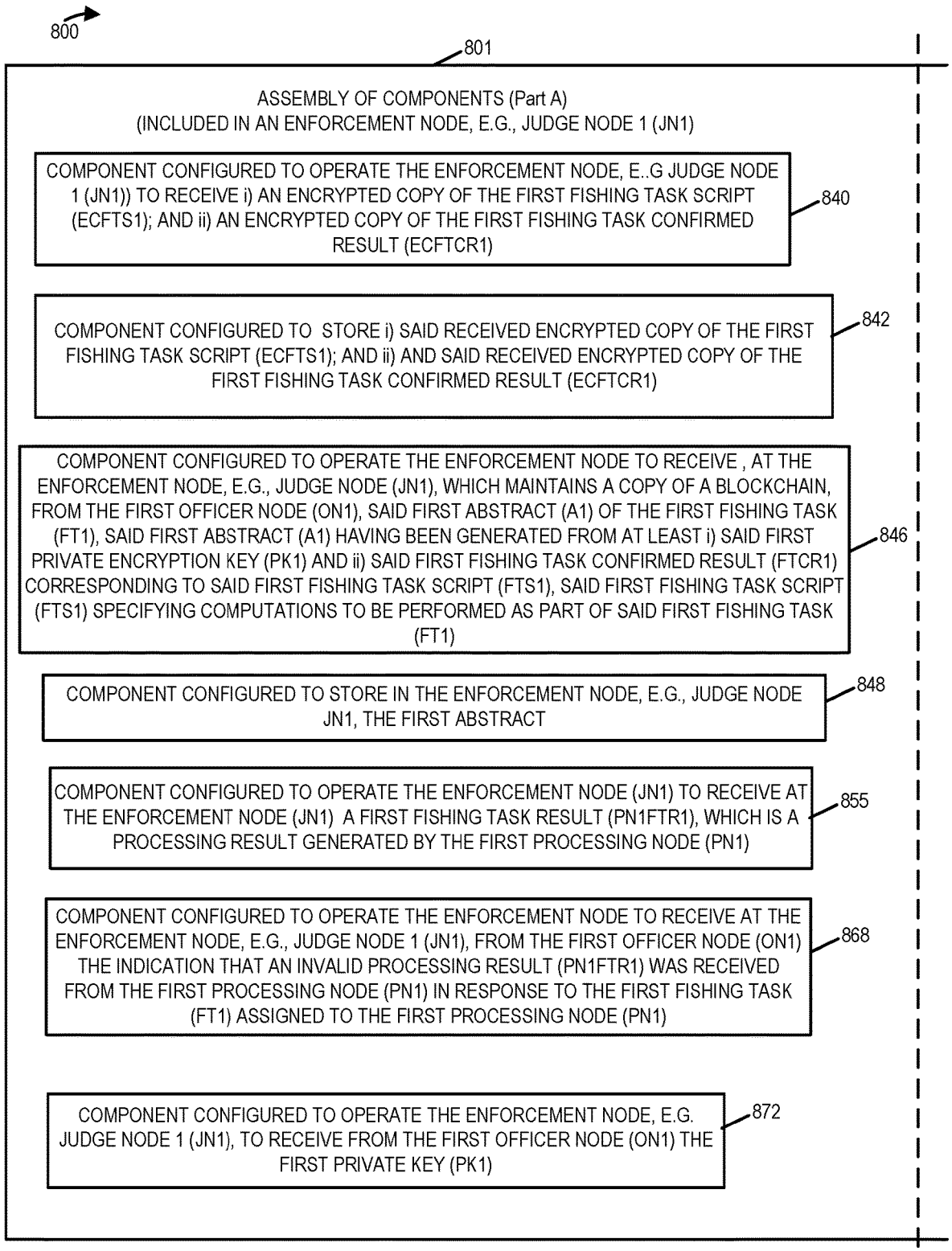
FIG. 8A is first part of a drawing of an exemplary assembly of components which may be included in an enforcement node in accordance with an exemplary embodiment.
Figures 8, 8B:
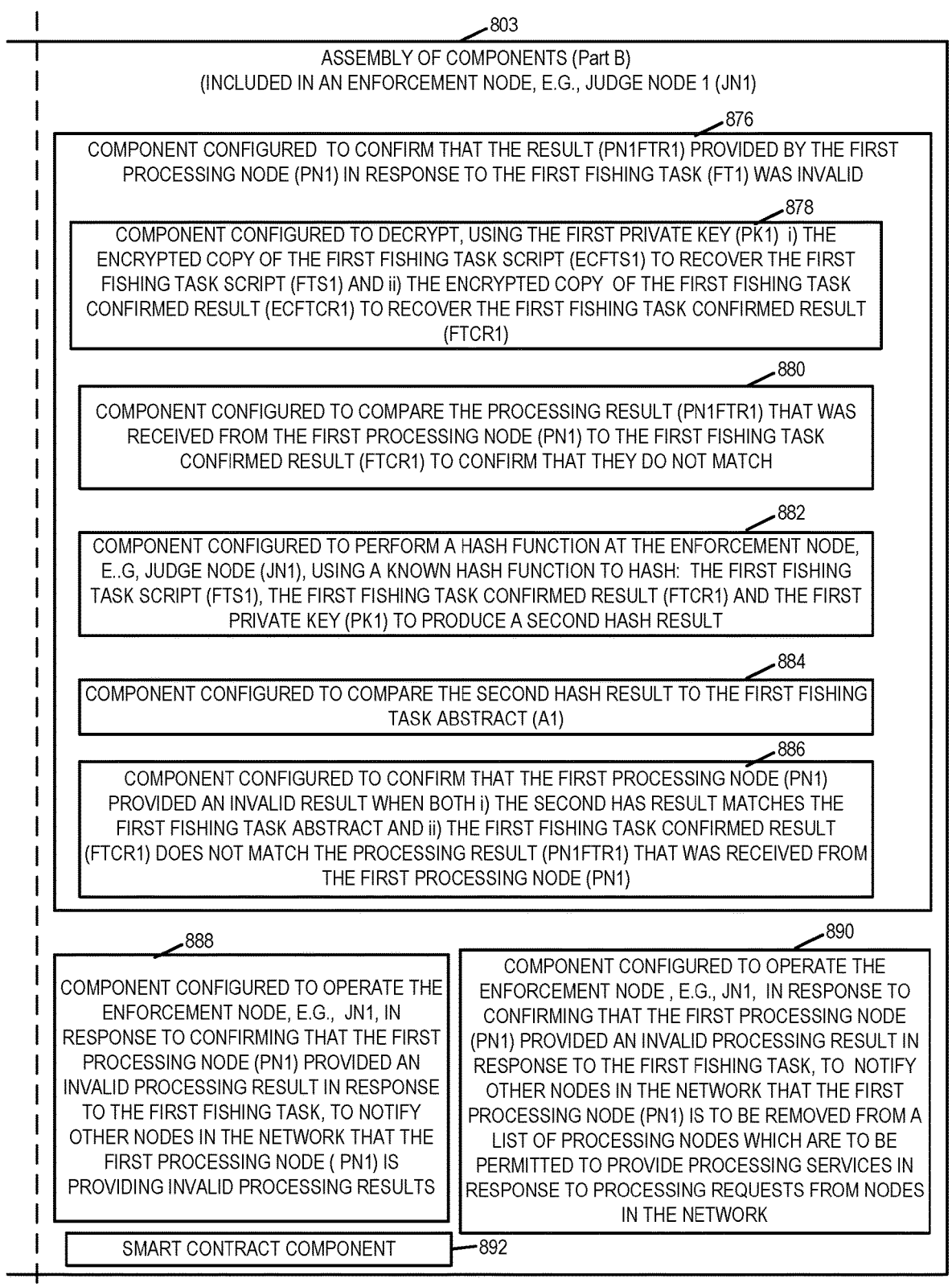
FIG. 8B is second part of a drawing of an exemplary assembly of components which may be included in an enforcement node in accordance with an exemplary embodiment.
FIG. 8 comprises the combination of FIG. 8A and FIG. 8B.

FIG. 8, comprising the combination of FIG. 8A and FIG. 8B, is a drawing of an exemplary assembly of components 800, comprising Part A 801 and Part B 803, which may be including in an enforcement node in accordance with an exemplary embodiment. Assembly of components 800 is, e.g. included in an enforcement node, e.g. any of the enforcement nodes (110, . . . , 112) of FIG. 1, enforcement node 700 of FIG. 7 and/or an enforcement node implementing steps of flowchart 200 of FIG. 2, which are performed by an enforcement node.

Assembly of components 800 can be, and in some embodiments is, used in enforcement node 700 of FIG. 7. The components in the assembly of components 800 can be, and in some embodiments are, implemented fully in hardware within the processor 702, e.g., as individual circuits. The components in the assembly of components 800 can, and in some embodiments are, implemented fully in hardware within the assembly of components 713, e.g., as individual circuits corresponding to the different components. In other embodiments some of the components are implemented, e.g., as circuits, within the processor 702 with other components being implemented, e.g., as circuits within assembly of components 713, external to and coupled to the processor 702. As should be appreciated the level of integration of components on the processor and/or with some components being external to the processor may be one of design choice. Alternatively, rather than being implemented as circuits, all or some of the components may be implemented in software and stored in the memory 710 of the enforcement node 700, with the components controlling operation of the enforcement node 700 to implement the functions corresponding to the components when the components are executed by a processor, e.g., processor 702. In some such embodiments, the assembly of components 800 is included in the memory 710 as assembly of components 712. In still other embodiments, various components in assembly of components 800 are implemented as a combination of hardware and software, e.g., with another circuit external to the processor providing input to the processor 702 which then under software control operates to perform a portion of a component's function. While processor 702 is shown in the FIG. 7 embodiment as a single processor, e.g., computer, it should be appreciated that the processor 702 may be implemented as one or more processors, e.g., computers. In embodiments, enforcement node 700 includes multiple processors, e.g. processor 702 and processor M 703.

When implemented in software the components include code, which when executed by the processor 702, configure the processor 702 to implement the function corresponding to the component. In embodiments where the assembly of components 800 is stored in the memory 710, the memory 710 is a computer program product comprising a computer readable medium comprising code, e.g., individual code for each component, for causing at least one computer, e.g., processor 702, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 8 control and/or configure the enforcement node 700, or elements therein such as the processor 702, to perform the functions of corresponding steps illustrated and/or described in the method of one or more of the flowcharts, signaling diagrams and/or described with respect to any of the Figures. Thus the assembly of components 800 includes various components that perform functions of corresponding one or more described and/or illustrated steps of an exemplary method, e.g., steps of the method of flowchart 200 of FIG. 2, e.g., with respect to steps performed by an enforcement node, and/or described or shown with respect to any of the other figures.

Assembly of components 800 includes a component 840 configured to operate the enforcement node, e.g. judge node 1 (JN1), to receive i) an encrypted copy of the first fishing task script (ECFTS1) and ii) an encrypted copy of the first fishing task confirmed result (ECFTCR1), and a component 842 configured to store: i) said received encrypted copy of the first fishing task script (ECFTS1) and ii) said received encrypted copy of the first fishing task confirmed result (ECFTCR1). Assembly of components 800 further includes a component 846 configured to operate the enforcement node to receive, at the enforcement node, e.g., judge node 1 (JN1), said first abstract (A1) of the first fishing task, said first abstract (A1) having been generated from at least i) said first private encryption key (PK1) and ii) said first fishing task confirmed result (FTCR1), corresponding to said first fishing task script (FTS1), said first fishing task script (FTS1) specifying computations to be performed as part of said first fishing task (FT1). In some embodiments, said first abstract (A1) had been generated from: i) said first private encryption key (PK1), ii) said first fishing task script (FTS1) and ii) said first fishing task confirmed result (FTCR1), e.g., using a known hash function. Assembly of components 800 further includes a component 848 configured to store in the enforcement node, e.g. judge node 1 (JN1), the received first abstract. Assembly of components 800 further includes a component 855 configured to operate the enforcement node (JN1) to receive a first fishing task result (PN1FTR1), which is a processing result, generated by the first processing node (PN1).

Assembly of components 800 further includes a component 868 configured to operate the enforcement node to receive at the enforcement node, from the first officer node an indication that an invalid processing result (PN1FTR1) was received from the first processing node (PN1) in response to the first fishing task (FT1), assigned to the first processing node (PN1), said first fishing task represented by first fishing task script (FTS1). Assembly of components 800 further includes a component 872 configured to operate the enforcement node, e.g. judge node 1 (JN1), to receive from the first officer node the first private encryption key (PK1), and a component 876 configured to confirm that the result (PN1FTR1) provided by the first processing node (PN1) in response to the first fishing task (TF1) was invalid. Component 876 includes a component 878 configured to decrypt, using the first private key (PK1), i) the encrypted copy of the first fishing task script (ECFTS1) to recover the first fishing task script (FTS1) and to decrypt the encrypted copy of the first fishing task confirmed result (ECFTCR1) to recover the first fishing task confirmed result (FTCR1), and a component 880 configured to compare the processing result (PN1FTR1) that was received from the first processing node (PN1) to the first fishing task confirmed result (FTCR1) to confirm that they do not match. Component 876 further includes a component 882 configured to perform a hash function at the enforcement node, e.g., judge node 1 (JN1), using a known hash function to hash: the first fishing task script (FTS1), the first fishing task confirmed result (FTCR1) and the first private encryption key (PK1) to produce a second hash result, and a component 884 configured to compare the second hash result to the first fishing task abstract (A1), which is a first hash result. Component 876 further includes a component 886 configured to confirm that the first processing node (PN1) provided an invalid result when both i) the second has result matches the first fishing task abstract and ii) the first fishing task confirmed result (FTCR1) does not match the processing result (PN1FTR!) that was received from the first processing node (PN).

Assembly of components further includes a component 888 configured to operate the enforcement node, e.g. JN1, in response to confirming that the first processing node (PN1) provided an invalid processing result in response to the first fishing task, to notify other nodes, e.g., other nodes including officer node 1 102, officer node N1 104, witness node 1 106, witness node N2 108, judge node N3 112, processing node 1 114 and processing node N4 116, in the network, e.g., network 100 that the first processing node (PN1), e.g., processing node 1 114, is providing invalid processing results, and a includes a component 890 configured to operate the enforcement node, e.g. JN1, in response to confirming that the first processing node (PN1) provided an invalid processing result in response to the first fishing task, to notify other nodes, e.g., other nodes including officer node 1 102, officer node N1 104, witness node 1 106, witness node N2 108, judge node N3 112, processing node 1 114 and processing node N4 116, in the network, e.g., network 100 that the first processing node (PN1), e.g., processing node 1 114, is to be removed from a list of processing nodes which are permitted to provide processing services in response to processing requests from nodes in the network. Assembly of components 800 further includes a smart contract component 892.

Figure 9:
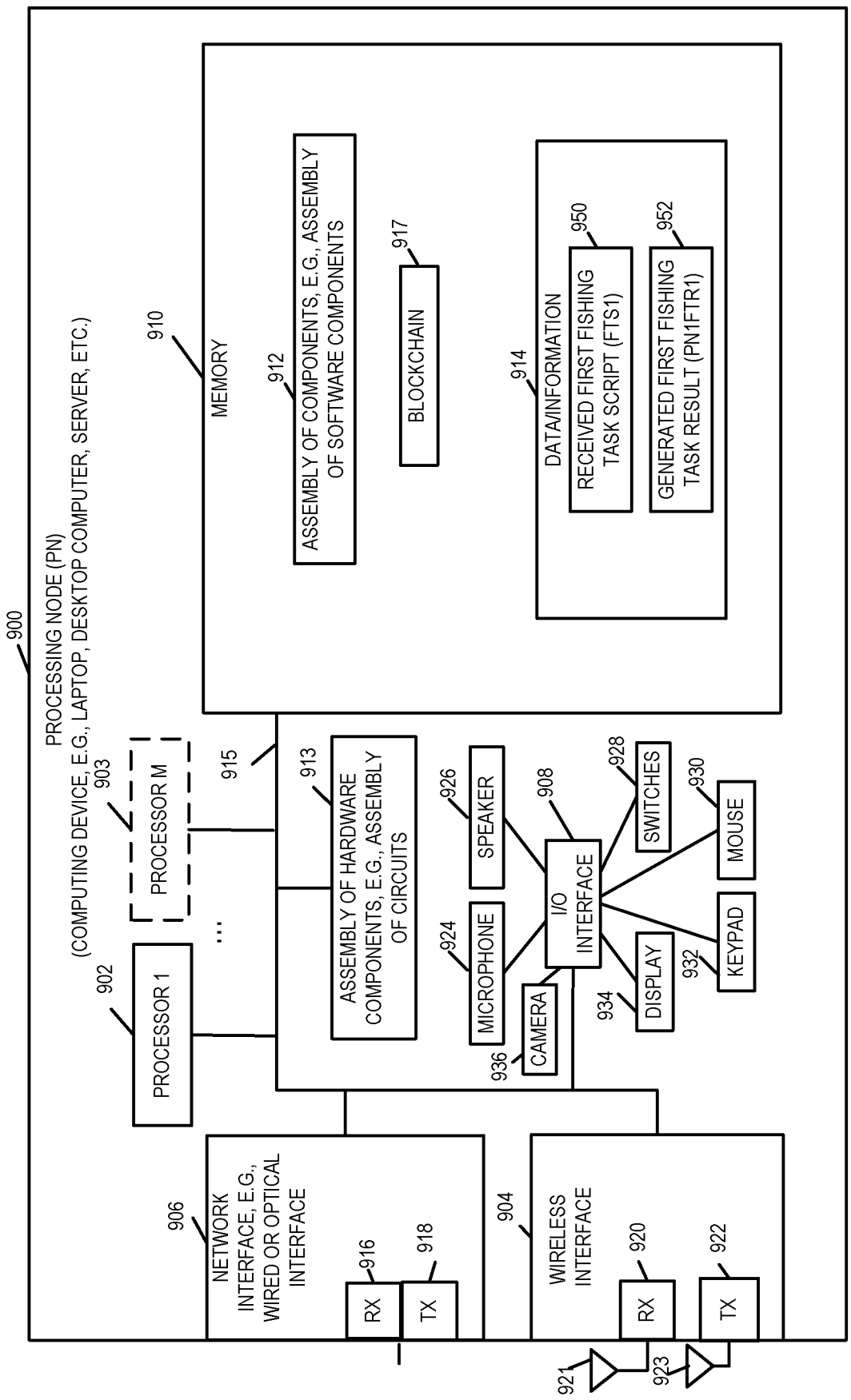
FIG. 9 is a drawing of an exemplary processing node, in accordance with an exemplary embodiment.

FIG. 9 is a drawing of an exemplary processing node (PN) 900, in accordance with an exemplary embodiment. Exemplary processing node 900, which is a computing device, is, e.g., a server, laptop, desktop computer, notepad computer, etc., in accordance with an exemplary embodiment. Exemplary processing node 900 is, e.g., any of the processing nodes (processing node 1 114, . . . , processing node N4 116) of FIG. 1, and/or a witness node implementing steps of a method 200 of FIG. 2, which are performed by a processing node and/or which are described with respect to FIG. 2.

Processing node 900 includes one or more processors (processor 1 902, . . . , processor M 903), wireless interface 904, network interface 906, e.g., a wired or optical interface, I/O interface 908, memory 910, and an assembly of hardware components 913, e.g., assembly of circuits, coupled together via a bus 915 over which the various elements may interchange data and information. Wireless interface 904 includes a wireless receiver 920 coupled to receive antenna 921, via which the processing node 900 may receive wireless signals from other devices. Wireless interface 904 further includes a wireless transmitter 922 coupled to transmit antenna 923, via which the processing node 900 may transmit wireless signals from other devices. In some embodiments, the same antenna is used for the receiver and transmitter. Network interface 906 includes a receiver 916 via which the processing node 900 may receive signals from other devices, e.g., over a wired backhaul connection. Network interface 906 includes a transmitter 918 via which the processing node 900 may transmit signals to other devices, e.g., over a wired backhaul connection.

Memory 910 includes an assembly of components 912, e.g., an assembly of software components, data/information 914, and a blockchain 917. Processing node 900 further includes a plurality of input/output devices, microphone 924, speaker 926, switches 928, mouse 930, keypad 932, display 934, and camera 936, coupled to I/O interface 908. Data/information 914 includes a received first fishing task script (FTS1) 950 and a generated first fishing task result (PN1FTR1) 952, which may be valid or invalid.

Figure 10:
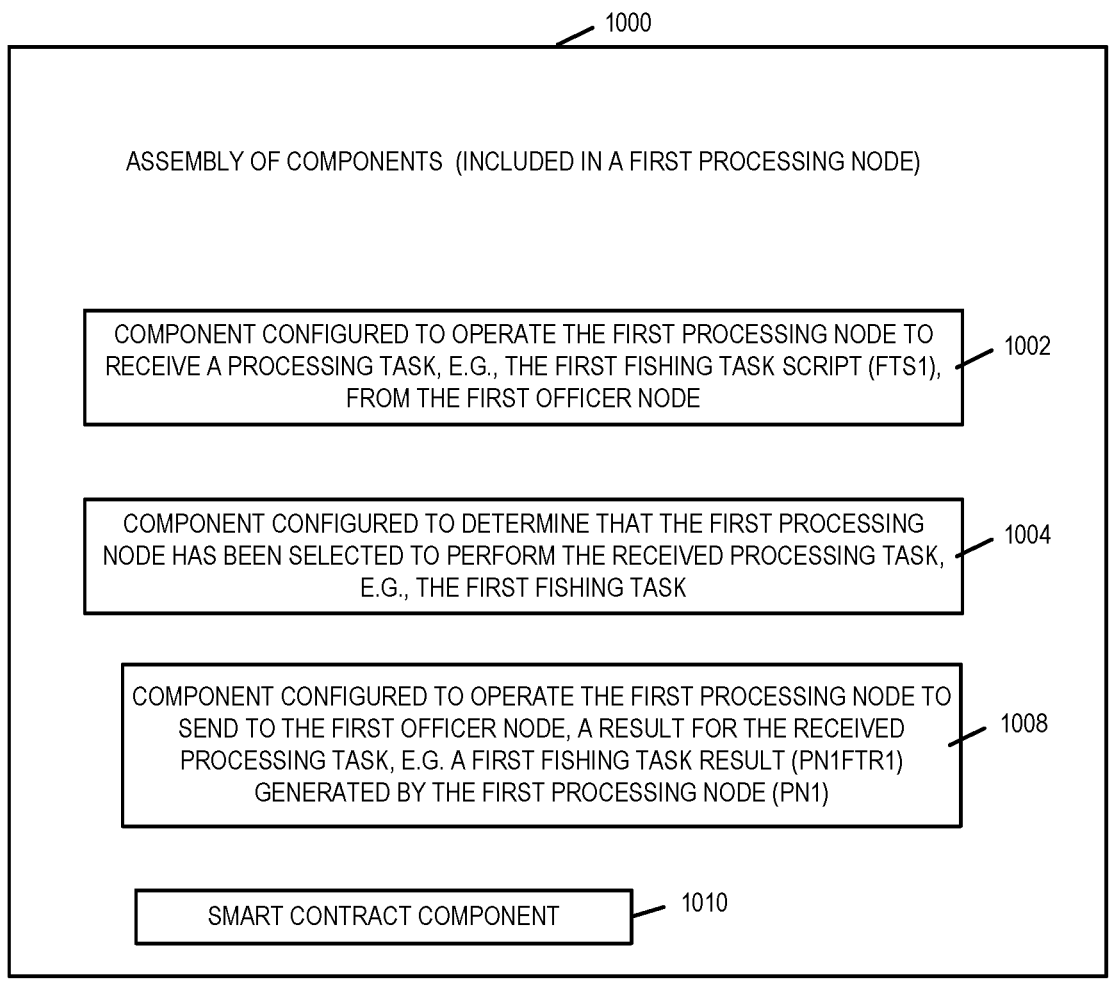
FIG. 10 is a drawing of an exemplary assembly of components which may be included in a processing node in accordance with an exemplary embodiment.
Figure 11:
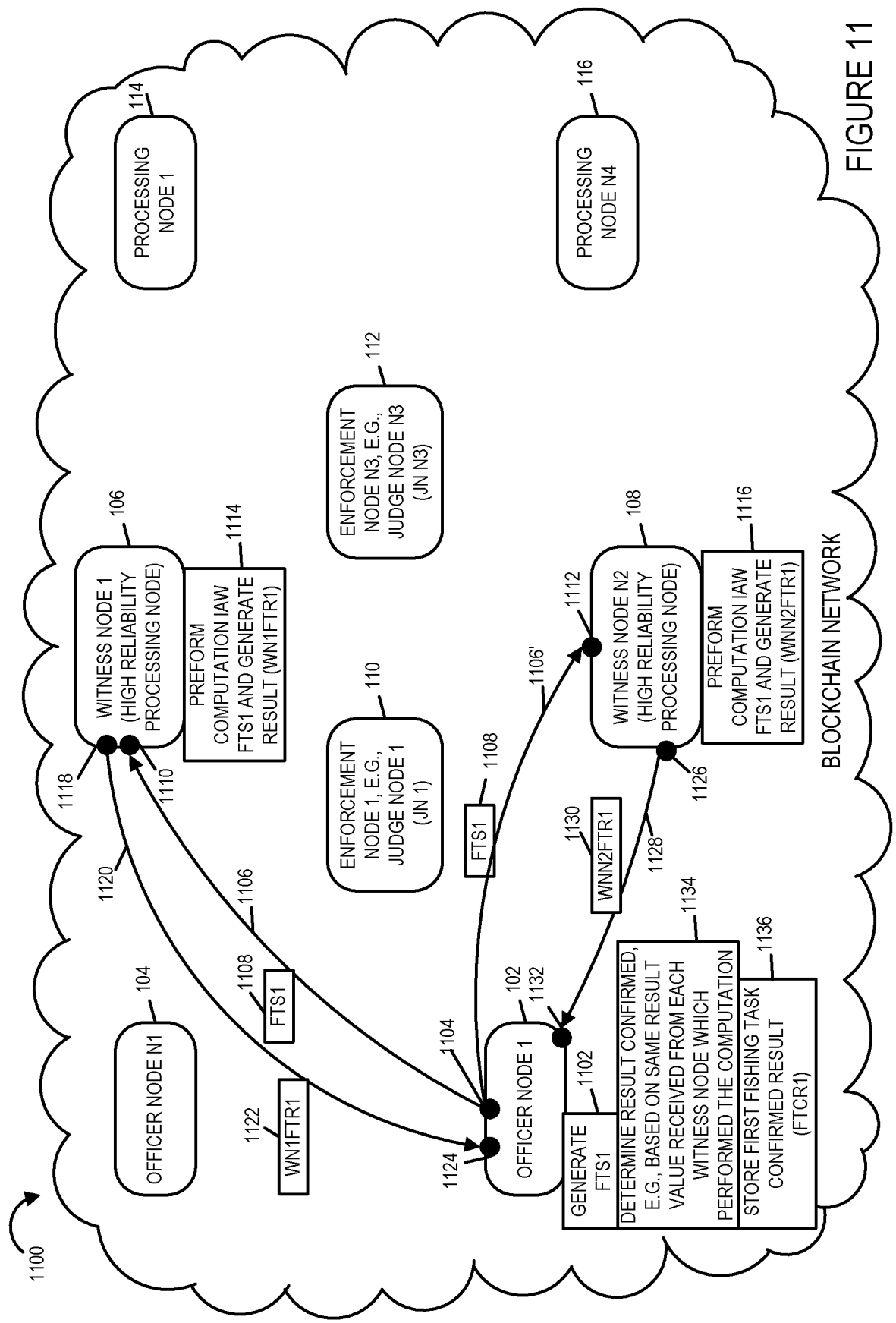
FIG. 11 is a drawing which illustrates a first part of an example of an exemplary method and exemplary signaling between nodes, in accordance with an exemplary embodiment; and the drawing of FIG. 11 illustrates processing results from multiple witness nodes, which are high reliability processing nodes, being used by an officer node to obtain a confirmed processing result, corresponding to an officer node generated first fishing task script.

FIG. 10 is a drawing of an exemplary assembly of components 1000 which may be included in a processing node in accordance with an exemplary embodiment. Assembly of components 1000 is, e.g. included in a processing node, e.g. any of the processing nodes (114, . . . , 116) of FIG. 1, processing node 900 of FIG. 9 and/or a processing node implementing steps of flowchart 200 of FIG. 2, which are performed by a processing node, and/or operations described with respect to FIG. 2 which are performed by a processing node.

Assembly of components 1000 can be, and in some embodiments is, used in processing node 900 of FIG. 9. The components in the assembly of components 1000 can, and in some embodiments are, implemented fully in hardware within the processor 902, e.g., as individual circuits. The components in the assembly of components 1000 can be, and in some embodiments are, implemented fully in hardware within the assembly of components 913, e.g., as individual circuits corresponding to the different components. In other embodiments some of the components are implemented, e.g., as circuits, within the processor 902 with other components being implemented, e.g., as circuits within assembly of components 913, external to and coupled to the processor 902. As should be appreciated the level of integration of components on the processor and/or with some components being external to the processor may be one of design choice. Alternatively, rather than being implemented as circuits, all or some of the components may be implemented in software and stored in the memory 910 of the processing node 900, with the components controlling operation of the processing node 900 to implement the functions corresponding to the components when the components are executed by a processor, e.g., processor 902. In some such embodiments, the assembly of components 1000 is included in the memory 910 as assembly of components 912. In still other embodiments, various components in assembly of components 1000 are implemented as a combination of hardware and software, e.g., with another circuit external to the processor providing input to the processor 902 which then under software control operates to perform a portion of a component's function. While processor 902 is shown in the FIG. 9 embodiment as a single processor, e.g., computer, it should be appreciated that the processor 902 may be implemented as one or more processors, e.g., computers. In embodiments, processing node 900 includes multiple processors, e.g. processor 902 and processor M 903.

When implemented in software the components include code, which when executed by the processor 902, configure the processor 902 to implement the function corresponding to the component. In embodiments where the assembly of components 1000 is stored in the memory 910, the memory 910 is a computer program product comprising a computer readable medium comprising code, e.g., individual code for each component, for causing at least one computer, e.g., processor 902, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 10 control and/or configure the processing node 900, or elements therein such as the processor 902, to perform the functions of corresponding steps illustrated and/or described in the method of one or more of the flowcharts, signaling diagrams and/or described with respect to any of the Figures. Thus the assembly of components 900 includes various components that perform functions of corresponding one or more described and/or illustrated steps of an exemplary method, e.g., steps of the method of flowchart 200 of FIG. 2, e.g., with respect to steps performed by a processing node, and/or described or shown with respect to any of the other figures.

Assembly of components 1000 includes a component 1002 configured to operate the first processing node to receive a processing task, e.g., the first fishing task (FT1), represented by first fishing task script (FTS1), from the first officer node, a component 1004 configured to determine that the first processing node has been selected to perform the received processing task, e.g., the first fishing task, and a component 1008 configured to operate the first processing node to send the first officer node, a result for the received processing task, e.g., a first fishing task result (PN1FTR1) generated by the first processing result. The first fishing task result (PN1FTR1), generated by the first processing result and sent to the first officer node, may be a valid result, e.g., in an example in which the first processing node performs the computation indicated in the first fishing task script correctly. Alternatively, the first fishing task result (PN1FTR1), generated by the first processing result and sent to the first officer node, may be an invalid result, e.g., in an example in which the first processing node does not perform the computation indicated in the first fishing task script correctly, e.g., due to a problem with the first processing node such as a hardware failure, software bug, glitch, corrupted data, etc., or due to the first processing node intentionally not performing the full set of computations indicated in FTS1, e.g., because the first processing node is trying to defraud, e.g., obtain payment for processing services which were not rendered. Assembly of components 1000 further includes a smart contract component 1010.

FIGS. 11-15 illustrate an example in accordance with an exemplary embodiment, e.g., in accordance with the method of flowchart 200 of FIG. 2. Drawing 1100 of FIG. 11, includes the exemplary system 100 of FIG. 1 and further includes exemplary steps and exemplary signaling. In step 1102 the first officer node 102 generate a first fishing task script (FTS1). In step 1104 the first officer node 102 sends signal 1106 communicating the first fishing task script (FTS1) 1108 to witness node 1 106 and sends signal 1106' communicating the first fishing task script (FTS1) 1108 to witness node N2 108. In some embodiments, signal 1106 and signal 1106' are the same signal, e.g. a broadcast signal.

In step 1110 witness node 1 106 receives signal 1106 and recovers the first fishing task script (FTS1). In step 1112 witness node N2 108 receives signal 1106' and recovers the first fishing task script (FTS1). In step 1114 witness node 1 106 performs computations in accordance with (JAW) the first fishing task script (FTS1) and generates a result (WN1FTR1). In step 1116 witness node N2 108 performs computations in accordance with (JAW) the first fishing task script (FTS1) and generates a result (WNN2FTR1).

In step 1118 witness node 1 106 generates and sends signal 1120, which communicates the processing result (WN1FTR1) 1122. In step 1124 the first officer node 102 receives signal 1120 and recovers the processing result WN1FTR1 1122.

In step 1126 witness node N2 108 generates and sends signal 1128, which communicates the processing result (WNN2FTR1) 1130. In step 1132 the first officer node 102 receives signal 1128 and recovers the processing result WNN2FTR1 1130.

In step 1134 the first officer node 102 compares the results (WN1FTR1, WNN2FTR1) received from the witness nodes (WN 1 106, WN N2 108), respectively, and determines the results are the same; thus the first officer node 102 determines that the results are confirmed. In step 1136 the first officer node 102 stores the confirmed result as the first fishing task confirmed result (FTCR1).

Figure 12:
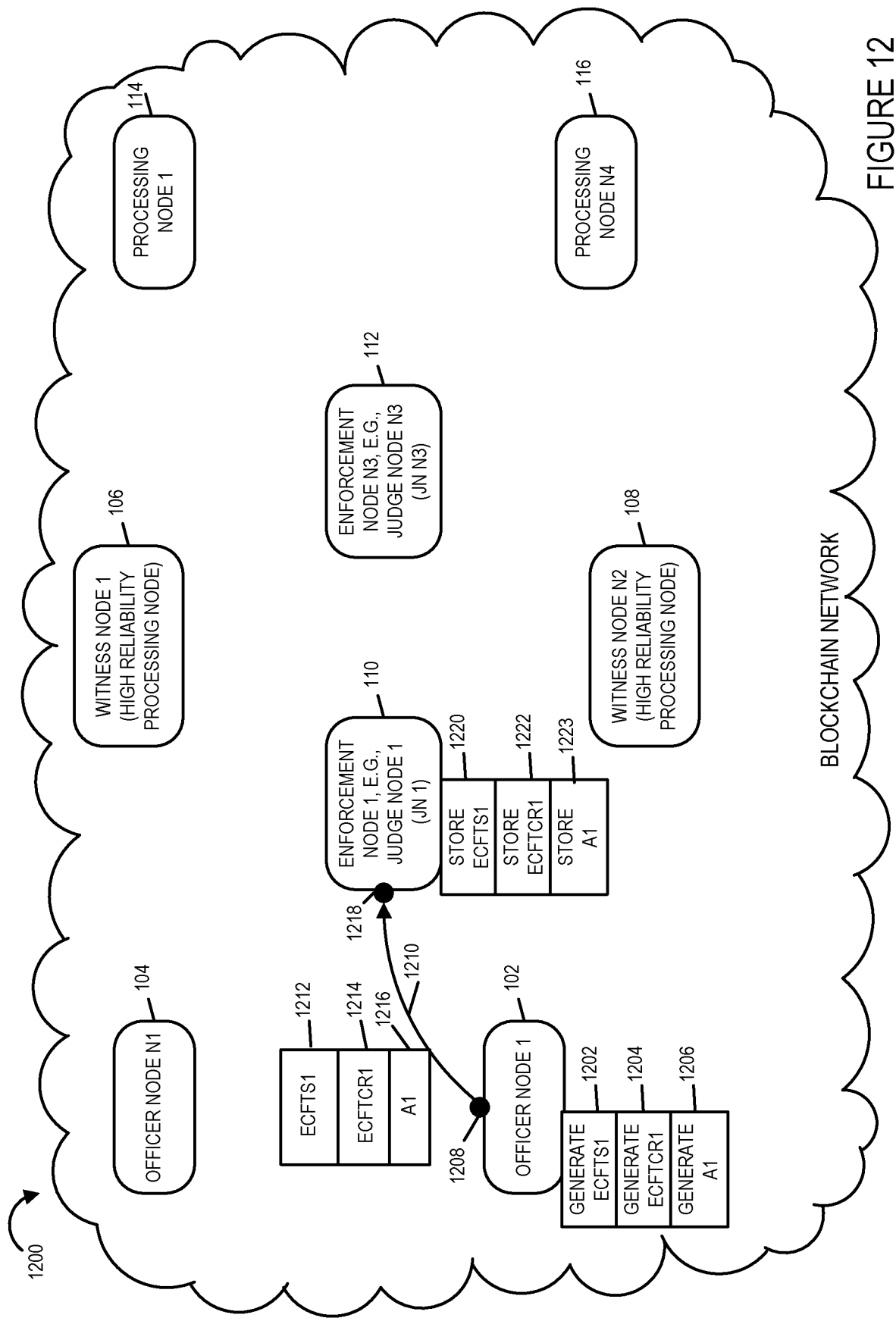
FIG. 12 is a drawing which illustrates a second part of an example of an exemplary method and exemplary signaling between nodes, in accordance with an exemplary embodiment; and the drawing of FIG. 12 illustrates the officer node generating an encrypted a copy of the first fishing task script, an encrypted copy of first fishing task confirmed result, and a first fishing task abstract, and communicating the generated information to an enforcement node, e.g. a judge node, where the information is stored to be available for later use.

The example continues in drawing 1200 of FIG. 12. In step 1202 the first officer node 102 generates an encrypted copy of the first fishing task script (ECFTS1) using a first private encryption key (PK1). In step 1204 the first officer node 102 generates an encrypted copy of the first fishing task confirmed result (ECFTCR1) using the first private encryption key (PK1). In step 1206 the first officer node 102 generates an abstract (A1) for the first fishing task using a hash function known to the first officer node 102 and enforcement node 1 (e.g., JN1) 110, using as input FTS1, FTCR1, and PK1.

In step 1208, the first officer node 102 generates and sends message(s) 1210 communicating the encrypted copy of the first fishing task script (ECFTS1) 1212, the encrypted copy of the first fishing task confirmed result (ECFTCR1) 1214, and the abstract (A1) 1216 for the first fishing task, to enforcement node 1 110, e.g. judge node 1 (JN 1). In step 1218 enforcement node 1 110 receives message(s) 1210 and recovers the communicated information. In step 1220 enforcement node 1 110 stores the encrypted copy of the first fishing task script (ECFTS1). In step 1222 enforcement node 1 110 stores the encrypted copy of the first fishing confirmed result (ECFTCR1). In step 1223 enforcement node 1 110 stores the abstract A1.

Figure 13:
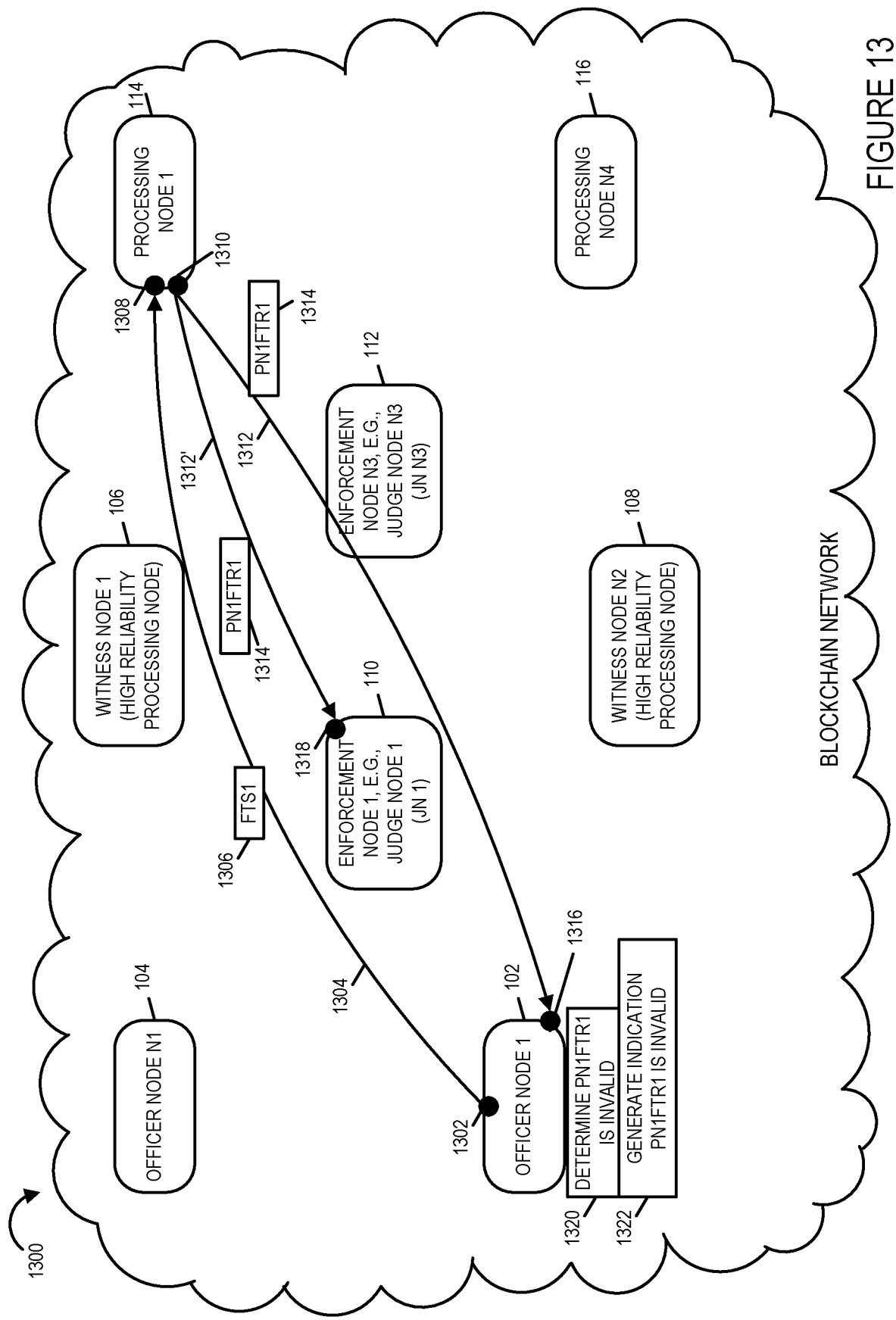
FIG. 13 is a drawing which illustrates a third part of an example of an exemplary method and exemplary signaling between nodes, in accordance with an exemplary embodiment; and the drawing of FIG. 13 illustrates the officer node sending the first fishing task script to a first processing node to test whether the first processing node is reporting valid or invalid processing results, and receiving a processing result from the first processing node which is determined to be invalid.

The example continues in drawing 1300 of FIG. 13. In step 1302 the first officer node 102 sends message 1304 to processing node 1 114 communicating the first fishing task FTS1 1306. In this example the first fishing task, represented by first fishing tasks script (FTS1) is being assigned to processing node 1 114 to test whether processing node 1 114 is providing valid or invalid computing results. Processing node 1 114 is unaware that it is being tested and view the first fishing task to which it has been assigned as just another processing task.

In step 1308, processing node 1 114 receives the first fishing task script (FTS1) 1306 to which it is assigned. Processing node 1 114 may or may not perform valid processing in accordance with FTS1. In step 1310 the processing node 1 (PN 1) generates and sends a processing result. Processing node 1 114 sends signal 1312 to officer node 1 102 including a reported processing result (PN1FTR1) 1314 in response to the first fishing task script (FTS1). Processing node 1 114 sends signal 1312' to enforcement node 1 110 including the reported processing result (PN1FTR1) 1314 in response to the first fishing task script (FTS1). In some embodiment, signal 1312 and signal 1312' are the same signal which is a broadcast signal from processing node 1 114.

In step 1316 officer node 1 102 receives signal 1312 and recovers the reported result PN1FTR1 1314. In step 1318 enforcement node 1 110 receives signal 1312' and recovers the reported result PN1FTR1 1314.

In step 1320, in this example, the first officer node 102 determines that the result (PN1FNTR1) reported by PN 1 114 is invalid since the result communicated in PN1FNTR1 does not match the result stored in the first fishing task confirmed result (FTCR1). In step 1322, in response to the determination the PN1FTR1 is invalid, officer node 1 generates an indication that PN1FTR1 is invalid.

Figure 14:
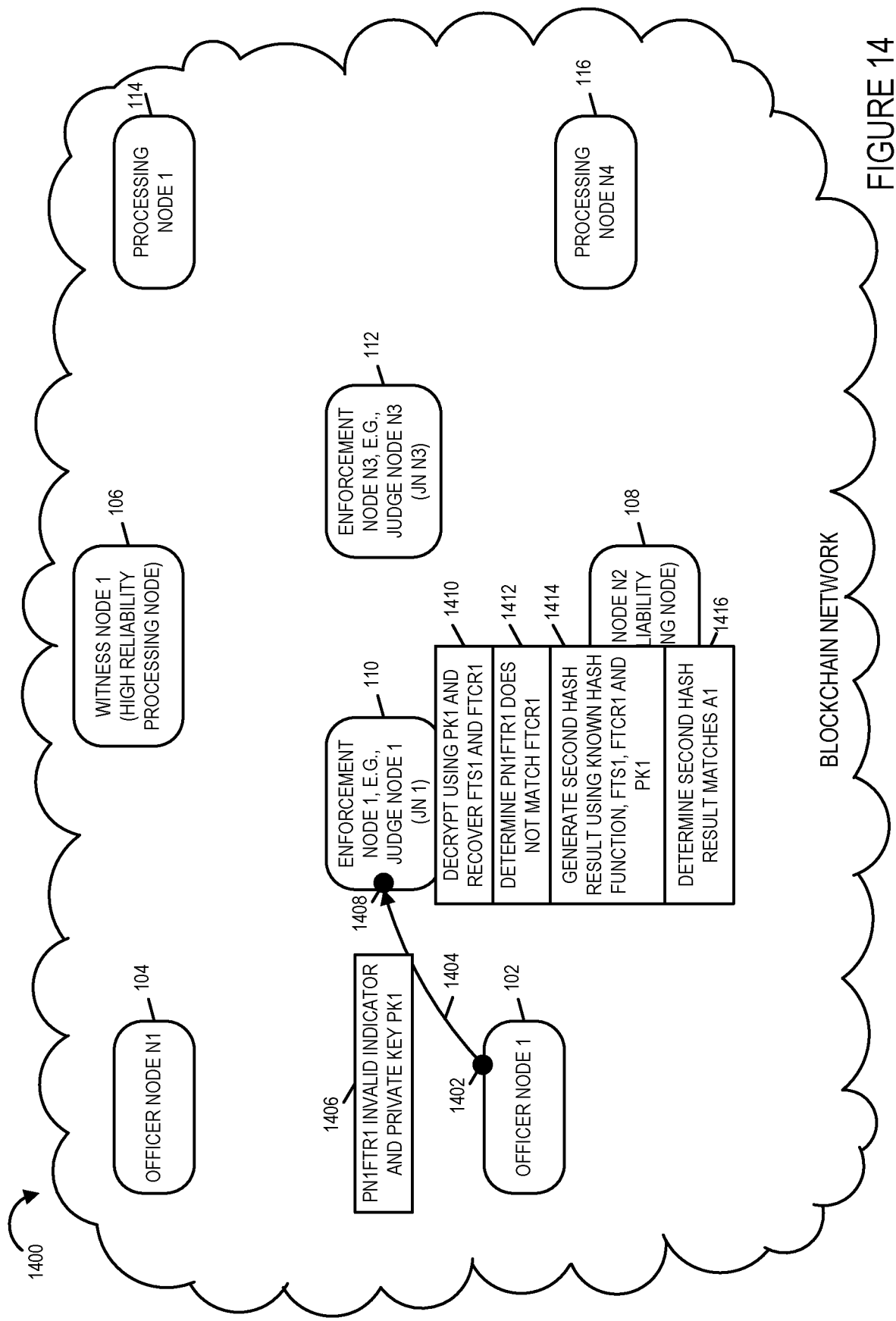
FIG. 14 is a drawing which illustrates a fourth part of an example of an exemplary method and exemplary signaling between nodes, in accordance with an exemplary embodiment; and the drawing of FIG. 14 illustrates the officer node sending the enforcement node an indication that the first processing node is reporting invalid results along with a private key, which allows the enforcement node to decrypt stored encrypted information including a encrypted copy of the first fishing task confirmed result, thus allowing the enforcement node to confirm that the first processing node is reporting invalid results.

The example continues in drawing 1400 of FIG. 14. In step 1402 the first officer node 102 generates and sends signal(s) 1404 to enforcement node 1 110 communicating an indication that the processing result (PN1FTR1) from PN1 114 is invalid and further communicating the private encryption key (PK1). In step 1408, enforcement node 1 110 receives signal(s) 1404 and recovers communicated information.

In step 1410 enforcement node 1 110 decrypts the stored encrypted copy of the first fishing task script (ECFTS1), using the first private encryption key (PK1), which is now in its possession, to recover the first fishing task script (FTS1). In step 1412 enforcement node 1 110 decrypts the stored encrypted copy of the first fishing task confirmed result (ECFTCR1), using the first private encryption key (PK1), which is now in its possession, to recover the first fishing task confirmed result (FTCR1). In step 1412 the enforcement node compares the received processing result (PN1FTR1) from processing node 1 (PN1) 114 to the first fishing task confirmed result (FTCR1) and determines that the results no not match.

In step 1414, the enforcement node 110 generates a second hash result using the known hash function, and FTS1, FTCR1 and PK1 as input. In step 1416 the enforcement node 110 determines that the second hash result matches abstract A1, which is a first hash result, which was generated previously by the first officer node 102.

Figure 15:
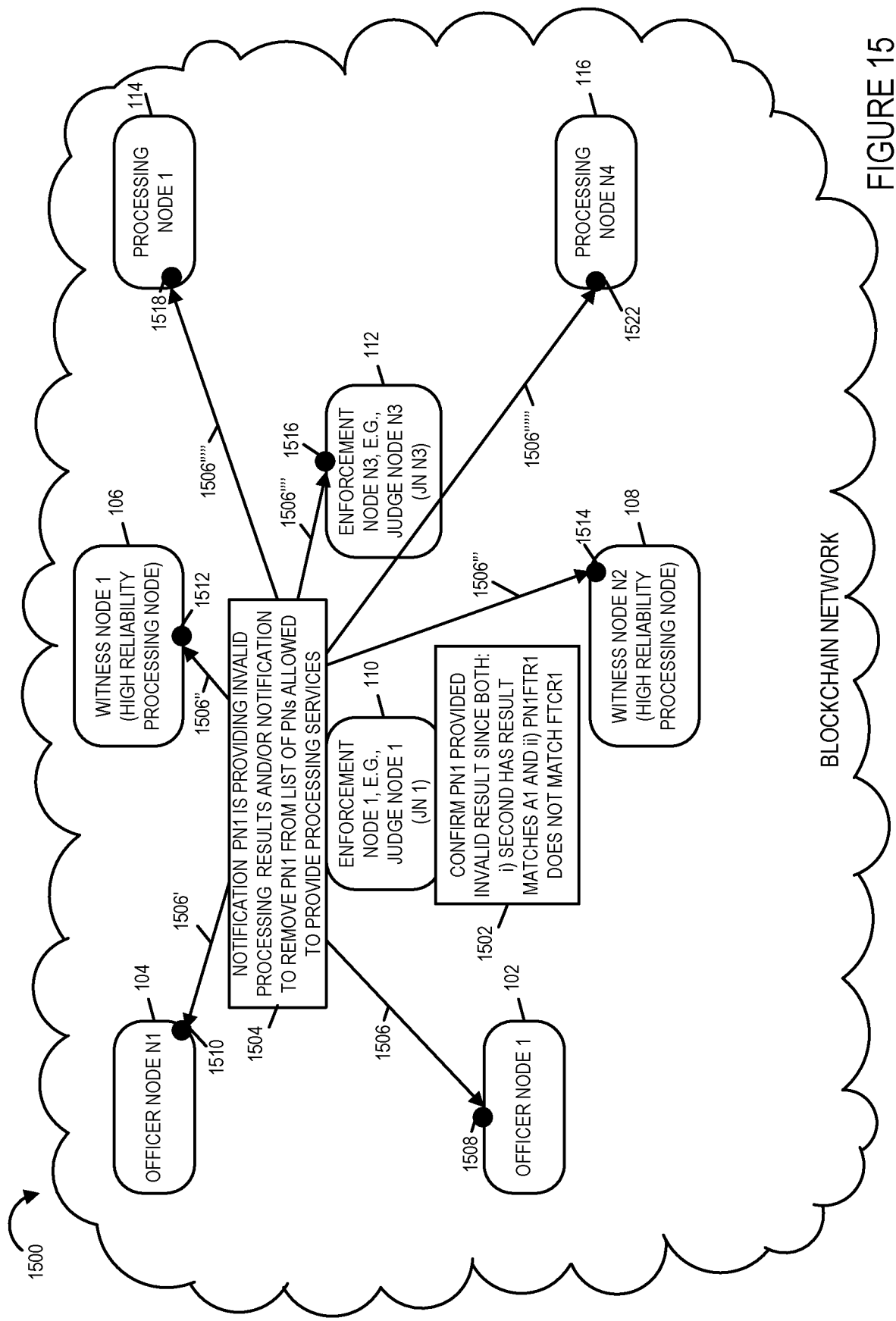
FIG. 15 is a drawing which illustrates a fifth part of an example of an exemplary method and exemplary signaling between nodes, in accordance with an exemplary embodiment; and the drawing of FIG. 15 illustrates the enforcement node confirming that the first processing node is reporting invalid processing results, and taking action in response to the determination.

The example continues in drawing 1500 of FIG. 15. In step 1502 enforcement node 1 110 confirms that processing node 1 (PN1) 114 provided an invalid processing result since both: i) the second hash result matches abstract A1, and ii) the processing result from PN1 (PN1FTR1) does not match the first fishing task confirmed result (FTCR1).

In step 1504 the enforcement node 110 notifies each of the other nodes in the network (including officer node 1 102, officer node N1 104, witness node 1 106, witness node N2 108, enforcement node N3 112, processing node 1 114 and processing node N4 116), that processing node 1 (PN1) 114 is providing invalid processing results and/or notifies each of the other nodes in the network (including officer node 1 102, officer node N1 104, witness node 1 106, witness node N2 108, enforcement node N3 112, processing node 1 114 and processing node N4 116), that processing node PN 1 114 is to be removed from a list of processing nodes allowed to provide processing services, as indicated by arrows (1506, 1506', 1506", 1506''', 1506'''', 1506''''', 1506'''''').

In step 1508 officer node 1 102 receives the notification, recovers the communicated information and/or implements instructions included in the notification, e.g. removes PN1 from a list of processing nodes allowed to provide processing services in response to requests for processing by nodes in the blockchain network. In step 1510 officer node N1 104 receives the notification, recovers the communicated information and/or implements instructions included in the notification. In step 1512 witness node 1 106 receives the notification, recovers the communicated information and/or implements instructions included in the notification. In step 1514 witness node N2 108 receives the notification, recovers the communicated information and/or implements instructions included in the notification. In step 1516 enforcement node N3 112 receives the notification, recovers the communicated information and/or implements instructions included in the notification. In step 1518 processing node 1 114 receives the notification, recovers the communicated information and/or implements instructions included in the notification. In step 1520 processing node 4 116 receives the notification, recovers the communicated information and/or implements instructions included in the notification.

Various aspects and/or features of some embodiments of the present invention are further described below.

Exemplary system architecture will now be described. In a novel approach referred to as an entrapment protocol, the protocol relies on among other things that: 1) the blockchain network used in the entrapment protocol is trustable and reliable; and 2) participants in the network are rational in the sense that their actions are intended to maximize individual profits.

Figure 16:
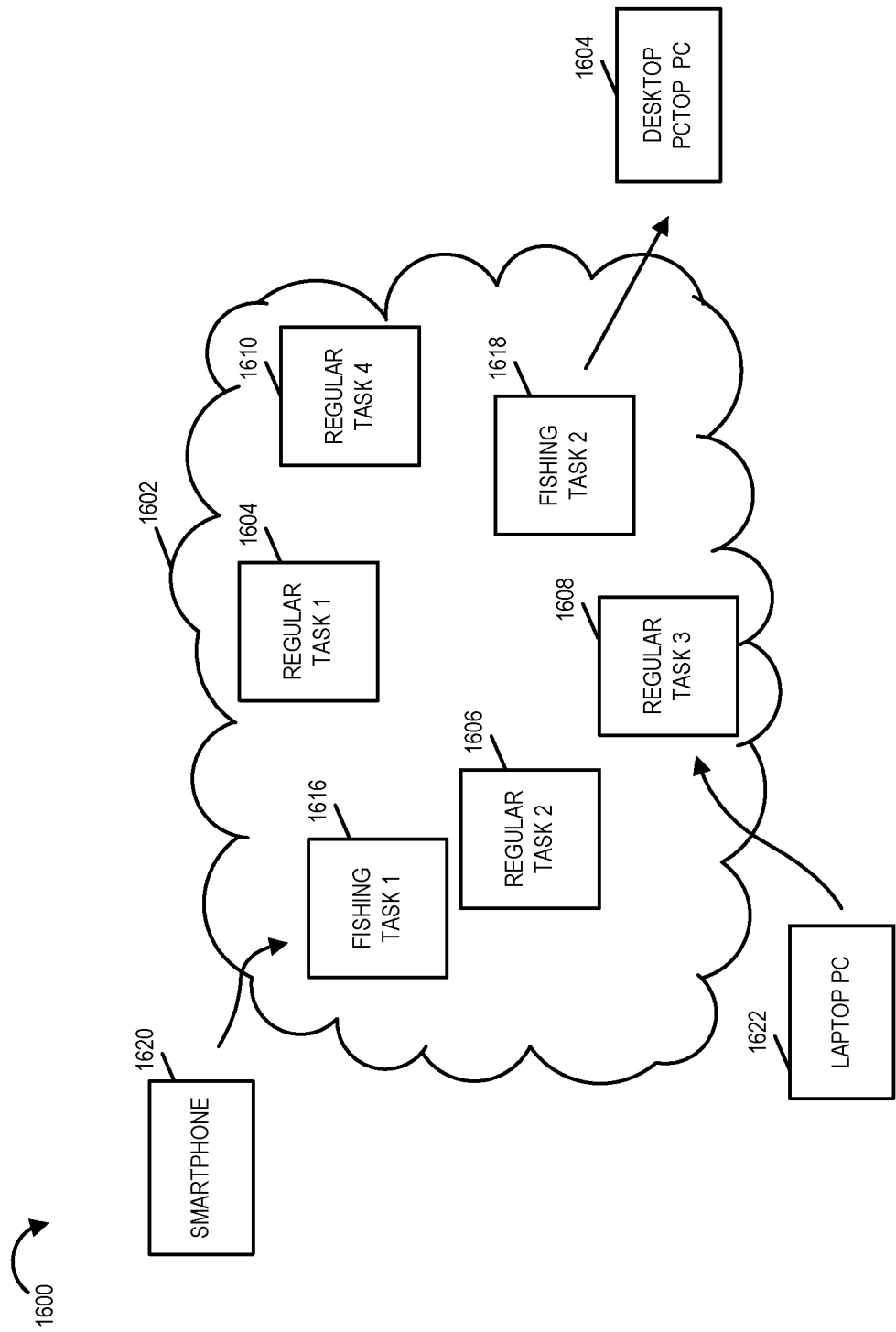
FIG. 16 includes a drawing illustrating features of an exemplary system implementing and exemplary Entrapment Protocol in accordance with an exemplary embodiment.

An overview will now be presented. In criminal law, entrapment is a practice whereby a law enforcement officer induces a person to commit a criminal offense that the person would have otherwise been unlikely or unwilling to commit. Entrapment Protocol borrows such an idea in which a client/user in the network, being a role of "officer", aims to catch a malicious provider in the network by assigning the provider with a fishing task. Since the outcome of the fishing task is predictable/known in advance by the officer, any misconduct on computing can be easily detected by the officer. In what follows, we provide a high-level discussion on the Entrapment Protocol mechanism. FIG. 16 includes a drawing 1600 illustrating features of an exemplary system implementing Entrapment Protocol. The exemplary system includes a plurality of computing devices including smartphone 1620, laptop PC 1622 and desktop PC 1624. There is a pool of computing tasks 1602 including a plurality of regular tasks including regular task 1 1604, regular task 2 1606, regular task 3 1608, and regular task 4 1610, and a plurality of fishing tasks including fishing task 1 1616 and fishing task 2 1618. In FIG. 16, smartphone 1620 is shown performing an operation with regard to fishing task 1 1616, e.g., submitting fishing task 1 into the pool. Laptop PC 1622 is shown performing an operation regarding regular task 3 1618, e.g., submitting regular computing task 3 into the pool, and desktop PC 1624 is shown performing an operation with regard to fishing task 2 1618, e.g., receiving fishing task 2 1618.

Figure 17:
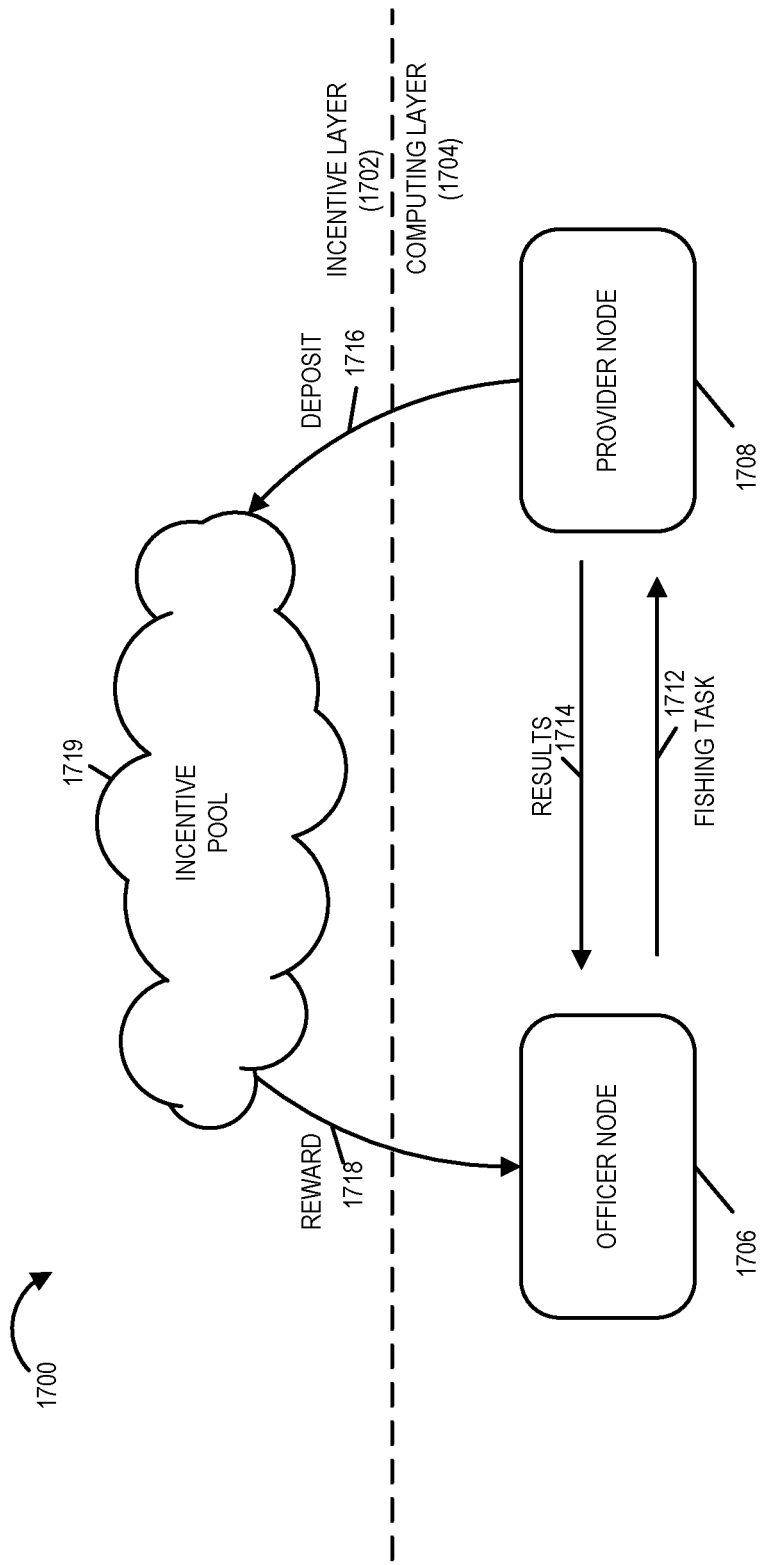
FIG. 17 illustrates two functional layers: an incentive layer and computing layer corresponding to an exemplary Entrapment Protocol and is used to describe features of the Entrapment Protocol.

First of all, for a user who wishes to be an officer, it needs to build up a fishing-task repository. Such a repository contains one or more computing tasks whose results are known and verified by the network. In addition, the information of each fishing task in the repository is written to the blockchain (for later use in result verification). Note, however, that based on the incentive protocol, the user can choose to be an officer or not. Meanwhile, a relatively large amount of deposit is required for a provider to participant in offering its idle computing resources. It is noteworthy that such a deposit is always far more than the reward received by the provider for correctly completing a computing task. By doing so, the provider would lose big if caught to be faulty. Next, the network randomly schedules a task from the task pool to a provider, in which the task pool contains both fishing tasks and regular tasks submitted to the network in a fixed time slot, e.g., one minute. Since Entrapment Protocol ensures that a malicious provider cannot filter out the fishing tasks, it is likely for such a provider to execute a fishing task as usual in its faulty manner. Once the provider feeds back the outcome to the officer, the officer can easily identify the correctness of the results by comparing the outcome with the one in its fishing-task repository. If identified to be faulty, the officer posts both results on the blockchain via verification smart contract. The judges, a subset or all of the nodes who run this verification smart contract, will rule on whether the officer is correct. If proved to be correct, the officer will be incentivized with a reward from the Entrapment Protocol incentive pool whereas the deposit of the provider will be forfeited and contributed to the Entrapment Protocol incentive pool. An illustration of the aforementioned mechanism is shown drawing 1700 of FIG. 17, in which Entrapment Protocol is considered as a combination of two functional layers: incentive layer 1702 and computing layer 1704. Officer node 1706 sends a fishing task 1712, e.g., a fishing task with a previously confirmed result, to a provider node 1708, e.g., a processing node. The provider node 1708 sends processing results 1714 to the officer node in response to the fishing task 1712. The returned results 1714 may be valid or may be invalid. The provider node 1716 has previously entered a deposit 1716 into the incentive pool 1719. If the officer node determines that the results 1715 are invalid, and the detected result invalidity is confirmed, e.g. by a Judge node, then the officer node 1706 receives a reward 1718 from the incentive pool and the provider node 1716 loses its deposit.

One can see that Entrapment Protocol could be very effective to secure outsourced computing if enforcement (of entrapment) is highly strengthened or the financial punishment on a malicious provider, if caught, is extremely severe. To strengthen the enforcement, the network can simply provide higher reward to officers who successfully catch misconduct. As a consequence, more users could be willing to be officers and submit fishing tasks more frequently. However, the overhead of the network in which many providers compute tasks whose results are already known and have been recorded on blockchain could be much higher, resulting in a more secure but much less efficient system. On the other hand, the Entrapment Protocol can sizably increase the required deposit from the provider. However, a prohibitively high deposit strongly discourage the participation of (regular) providers to offer their computing resources. In the following sections, we will describe the technical details in each Entrapment Protocol building block, including fishing task repository, task scheduler, result verification, and incentive protocol.

The Fishing-task Repository will now be described. To be an officer, a user first prepares a set of fishing tasks whose computing results need to be verified by the network. The approach of generating a fishing task is described as follows. A user first submits a regular computing task to the computing network along with a flag indicating that this task will be used later as a fishing task. If such a flag is detected by the task scheduler, this task will be executed by a set of witnesses in the network. These witnesses then send results to the verification smart contract. If these results are proved (by the smart contract) to be aligned, one can claim that the result is verified by the network. Then, the user adds this task to her repository and posts a proof on the blockchain, indicating that this task in her repository is verified to be a fishing task. In Entrapment Protocol, such a proof is an abstract (e.g. a hash via SHA1) generated from a block containing the computing task script, the results and a user-specific key (e.g., a private key or a field like bitcoin nonce). This user-specific key is of importance to prevent malicious providers from filtering out a fishing task. Otherwise, since blockchain is transparent to all users, a provider can always compare the abstracts generated from the task script and the result to identify a fishing task. In addition, a fishing task in the repository needs to be removed if this task has been used to successfully catch a malicious provider. This is because, otherwise, this provider can announce this task script on the blockchain, making this fishing task known to every user in the network.

Nowadays there exist many well-studied compromise-based scheduling algorithms, such as proportional fair scheduler widely used in communication systems. In Entrapment Protocol, however, we suppose that malicious providers are capable of processing any information to avoid being trapped. In other words, any compromise-based design in scheduling will be utilized by malicious providers to lower the probability of being caught. Therefore, Entrapment Protocol employs a uniform randomly task scheduler. That is, a submitted task is assigned to all providers with equal probability. Another benefit of doing so is that the computation needed in scheduling is minimized. This indicates that such a task scheduler can be easily implemented in a distributed fashion, say, executed by smart contracts in Ethereum.

In practice, as the number of task submissions from individuals follows Poisson process over time, it is likely to have no task submitted in a given time slot T, i.e., an empty queue for scheduling. To facilitate system analysis and optimization, we suppose that in every time slot T there exists at least one task in the queue for scheduling. That is, Entrapment Protocol always imposes one computing task in the queue in every time slot T. To achieve this goal, for example, the witnesses in the network can be enforced to submit a task in very time slot T in a round robin manner.

Result Verification will now be described. Entrapment Protocol has two result verification processes. One occurs in constructing the fishing-task repository and the other in verifying the outsourced computation. In the phase of constructing the fishing-task repository, N witnesses execute the same computing task and output results, vector Yi (the outcome from the i-th witness with I=1, 2, . . . N).

Another verification process corresponds to ensuring that the fishing-task results Yf from the provider is correct. This occurs when a fishing task is complete by a provider and its results are fed back to the officer. If the result is incorrect, the officer will open a case to claim the misconduct of the provider.

In this section, we discuss the Entrapment Protocol incentive protocol which could effectively discourage the provider misconduct. The proposed incentive protocol is consist of four financial components, which are presented in order as follows. Due to anonymity of all participants, we should consider Sybil attacks in our incentive protocol, in which the attacker subverts the network by creating a large number of pseudonymous identities. We assume that an attacker may create as many identities as she likes. The Entrapment Protocol resists such attacks via its incentive protocol.

1) The cost of generating fishing task: When outsourcing a computing task, a user should fairly compensate the provider for computing the task at hand. This compensation should be at least higher than the cost of provider for doing this computation job. To generate a fishing task, a task is always assigned to a set of reputable and trustable users, a.k.a. witness nodes, rather than, like regular task, assigned to one provider in the network. Since there exist relatively few witnesses in the network as compared to the number of general processing nodes, if the compensation for computing a fishing task is low, a Sybil attack by consistently submitting a large number of fishing tasks in a period from a number of anonymous participants will easily fully occupy all witnesses computing resources, leading to the situation in which the witnesses have no capacity for executing its normal jobs, e.g., verifying transactions on blockchain. As a result, Entrapment Protocol imposes high cost on generating a fishing task. That is, the user needs to pay much more for having a fishing task verified by the network. Note, however, that if the reward for reporting a malicious provider is much higher than the cost of preparing a fishing task, the willingness of generating fishing tasks from users should remain.

2) Deposit: in some embodiments, requires deposit from providers to discourage their misconduct, and from officers to thwart Sybil attacks. Specifically, if a provider misconduct is detected by the officer, the deposit D from the provider, as penalty, will be forfeited and contributed to the Entrapment Protocols's incentive pool, which is owned and maintained by the Entrapment Protocol. The payout as a reward to the officer is taken from the incentive pool. To balance the incentive pool and guarantee the Entrapment Protocol's effectiveness on security, an adaptive mechanism on deposit D is used in some embodiments.

In order to avoid Sybil attack, a small amount of deposit ~D from officer who reports a misconduct is required, in some embodiments. This small deposit, however, must be enough to pay for the cost of Judges to perform the result verification. We assume ~D<<D.

3) Reward of catching misconduct: First of all, the reward R to the officer for catching misconduct should be derived from the target security level of the network.

In the preceding section, we have introduced the architecture
and key components in Entrapment Protocol. The higher the rate of submitting fishing tasks is, the more secure the network performs. However, higher rate implies that network-wise overhead
of computing the fishing tasks can be overwhelming as computing fishing tasks is completely waste of network resources.

Numbered List of Exemplary Method Embodiments

Method Embodiment 1

A processing verification method for use in a system including multiple network nodes, the method comprising: receiving (246), at an enforcement node (e.g., judge node JN1) which maintains a copy of a block chain, from a first officer node (ON1), a first abstract (A1) of a first fishing task (FT1), said first abstract (A1) having been generated from at least i) a first private encryption key (PK1) and ii) a first fishing task confirmed result (FTCR1) corresponding to a fishing task script (FTS1), said first fishing task script (FTS1) specifying computations to be preformed as part of a first fishing task (FT1); storing (248), in the enforcement node (e.g., judge node 1 (JN1)), the first abstract; receiving (255) at the enforcement node (JN1) a first fishing task result (PN1FTR1), which is a processing result that was generated by a first processing node (PN1) (this can be received in a broadcast from PN1 to the block chain); receiving (268) at the enforcement node (JN1) from the first officer node (ON1) an indication that an invalid processing result (PN1FTR1) was received from the first processing node (PN1) in response to the first fishing task (FT1) assigned to the first processing node (PN1); and operating (276) the enforcement node (JN1) to confirm that the result (PN1FTR1) provided by the first processing node (PN1) in response to the first fishing task (FT1) was invalid.

Method Embodiment 2

The method of Method Embodiment 1, further comprising: operating (240) the enforcement node (JN1) to receive, prior to receiving (268) said indication that an invalid processing result (PN1R1) was received from the first processing node (PN1) in response to the first fishing task (FT1) assigned to the first processing node (PN1), i) an encrypted copy of the first fishing task script (ECFTS1); and ii) an encrypted copy of the first fishing task confirmed result (ECFTCR1); and operating (242) the enforcement node (JN1) to store said encrypted copy of the first fishing task script (ECFTS1); and the encrypted copy of the first fishing task confirmed result (ECFTCR1).

Method Embodiment 3

The method of Method Embodiment 2, wherein said enforcement node (JN1) is a full block chain node that stores a full set of block chain information.

Method Embodiment 4

The method of Method Embodiment 2, further comprising: operating (272) the enforcement node (JN1) to receive from the first officer node (ON1) the first private key (PK1); and wherein the private key is used to confirm that the result (PN1FTR1) provided by the first processing node (PN1) in response to the first fishing task (FT1) was invalid.

Method Embodiment 5

The method of Method Embodiment 2, wherein said indication that an invalid processing result (PN1FTR1) was received from a first processing node (PN1) in response to the first fishing task (FT1) assigned to the first processing node (PN1) is generated and broadcasted by a smart contract component running on said first officer node (ON1).

Method Embodiment 6

The method of Method Embodiment 1, wherein the first abstract (A1) is a proof in the form of a hash sequence generated by at least the first officer node (ON1) performing a hash of the first fishing task script (FTS1), a first fishing task confirmed result (FTCR1) corresponding to the first fishing task script (FTS1) and a first private key (PK1).

Method Embodiment 7

The method of Method Embodiment 6, wherein said hash is a predetermined hash function known to the first officer node (ON1) and to the first enforcement node (JN1).

Method Embodiment 8

The method of Method Embodiment 7, wherein operating (276) the enforcement node (JN1) to confirm that the result (PN1FTR1) provided by the first processing node (PN1) in response to the first fishing task (FT1) was invalid includes: decrypting (278), using the first private key (PK1) to decrypt: i) the encrypted copy of the first fishing task script (ECFTS1) to recover the first fishing task script (FTS1); and ii) the encrypted copy of the first fishing task confirmed result (ECFTCR1) to recover the first fishing task confirmed result (FTCR1).

Method Embodiment 9

The method of Method Embodiment 8 wherein operating (276) the enforcement node (JN1) to confirm that the result (PN1FTR1) provided by the first processing node (PN1) in response to the first fishing task (FT1) was invalid further includes: comparing (280) the processing result (PN1FTR1) that was received from the first processing node (PN1) to the first fishing task confirmed result (FTCR1) to confirm that they do not match; and performing (282) a hash at the enforcement node (JN1) using the known hash function to hash the first fishing task script (FTS1), the first fishing task confirmed result (FTCR1) (corresponding to the first fishing task script (FTS1)) and the first private key (PK1) to produce a second hash result; and comparing (284) the second hash result to the first fishing task abstract (A1) (which is a first hash result generated by ON1); and confirming (286) that the first processing node (PN1) provided an invalid result when both i) the second hash result matches the first fishing task abstract (A1) and ii) the first fishing task confirmed result (FTCR1) (corresponding to the first fishing task script (FTS1)) does not match the processing result (PN1FTR1) that was received from the first processing node (PN1).

Method Embodiment 10

The method of Method Embodiment 9, wherein the enforcement node's actions including said steps of comparing (280) the processing result (PN1FTR1), performing (282) a hash, comparing (284) the second hash result and confirming (286) are performed by a verification smart contract running on the enforcement node.

Method Embodiment 11

The method of Method Embodiment 1, further comprising: operating (288) the enforcement node (JN1), in response to confirming that the first processing node (PN1) provided an invalid processing result in response to the first fishing task, to notify other nodes in the network that the first processing node (PN1) is providing invalid processing results.

Method Embodiment 12

The method of Method Embodiment 1, further comprising: operating (290) the enforcement node (JN1), in response to confirming that the first processing node (PN1) provided an invalid processing result in response to the first fishing task, to further notify other nodes in the network that the first processing node (PN1) is to be removed from a list of processing nodes which are to be permitted to provide processing services in response to processing requests from nodes in the network.

Method Embodiment 13

The method of Method Embodiment 12, wherein said enforcement node (JN1) receives the processing result (PN1FTR1) returned by the first processing node (PN1) in a broadcast processing result message sent by the first processing node (PN1) to other nodes in the network or from the first officer node (ON1).

Method Embodiment 14

The method of Method Embodiment 13, further comprising: operating (204) the first officer node (ON1) to generate a set of fishing tasks (FTs) and corresponding confirmed results to be used by enforcement purposes, said set of fishing tasks and corresponding confirmed results including at least a first fishing task script (FTS1) and a corresponding first fishing task confirmed result (FTCR1); and operating (252) the first officer node (ON1) to sending the first fishing task script (FTS1) to said first processing node (PN1) to check processing being performed by said first processing node (PN1).

Method Embodiment 15

The method of Method Embodiment 14, further comprising: receiving (254), at the first officer node (ON1), from the first processing node (PN1) the first fishing task result (PN1FTR1) generated by the first processing node (PN1); and checking (256), at the first officer node (ON1) the first fishing task result (PN1FTR1) to determine if the result is valid.

Method Embodiment 16

The method of Method Embodiment 15, wherein checking (256) the first fishing task result (PN1FTR1) to determine if the result is valid includes: comparing (258), at the first officer node (ON1) the returned first fishing task result (PN1FTR1) to the previously stored first fishing task confirmed result (FTCR1); determining (264) that the returned first fishing task result (PN1FTR1) (from the first processing node PN1) is invalid when the returned first fishing task result (PN1FTR1) does not match the previously stored first fishing task confirmed result (FTCR1); and determining (262) that the returned first fishing task result (PN1FTR1) (from the first processing node PN1) is valid when the returned first fishing task result (PN1FTR1) matches the previously stored first fishing task confirmed result (FTCR1).

Method Embodiment 17

The method of Method Embodiment 16, further comprising: operating (268) the first officer node (ON1) to communicate to the enforcement node (JN1) the indication that the first officer node (ON1) received the invalid processing result (PN1FTR1) from the first processing node (PN1) in response to the first fishing task (FT1) assigned to the first processing node (PN1); and operating (280) the first officer node (ON1) to communicate to the enforcement node (JN1) the first private key (PK1) to allow the enforcement node (JN1) to decrypt the previously supplied encrypted copy of the first fishing task confirmed result (ECFTCR1).

Method Embodiment 18

The method of Method Embodiment 17, wherein operating the first officer node (ON1) to generate a set of fishing tasks and corresponding confirmed results to be used by enforcement purposes, said set of fishing tasks and corresponding confirmed results including at least the first fishing task script (FTS1) and corresponding first fishing task confirmed result (FTCR1) includes: operating (210) the first officer node (ON1) to send said first fishing task script (FTS1) to a plurality of witness nodes; and verify (220) that the witness nodes provide the same fishing task result (e.g., result WN1FTR1 from WN 1 is the same as result WNN2FTR1 from WN N2) to the first fishing task (which is a processing task, e.g. specified by the first fishing task script (FTS1)) before storing the first fishing task result as the first fishing task confirmed result (FTCR1) in said set of fishing tasks results and corresponding confirmed results.

Method Embodiment 19

The method of Method Embodiment 18, wherein said witness nodes are processing nodes which are known to provide reliable processing results, said witness nodes being more reliable than said first processing node (PN1).

Numbered List of Exemplary System Embodiments

System Embodiment 1

A system (100) comprising: an enforcement node (110) including: a first processor (702) configured to: operate the enforcement node (110) to receive (246), at an enforcement node (e.g., judge node JN1) which maintains a copy of a block chain, from a first officer node (ON1), a first abstract (A1) of a first fishing task (FT1), said first abstract (A1) having been generated from at least i) a first private encryption key (PK1) and ii) a first fishing task confirmed result (FTCR1) corresponding to a fishing task script (FTS1), said first fishing task script (FTS1) specifying computations to be preformed as part of a first fishing task (FT1); store (248), in the enforcement node (e.g., judge node 1 (JN1)), the first abstract; operate the enforcement node (110) to receive (255) at the enforcement node (JN1) a first fishing task result (PN1FTR1), which is a processing result that was generated by a first processing node (PN1) (114) (this can be received in a broadcast from PN1 to the block chain); operate the enforcement node (110) to receive (268) at the enforcement node (JN1) from the first officer node (ON1) an indication that an invalid processing result (PN1FTR1) was received from the first processing node (PN1) in response to the first fishing task (FT1) assigned to the first processing node (PN1); and confirm (276) that the result (PN1FTR1) provided by the first processing node (PN1) in response to the first fishing task (FT1) was invalid.

System Embodiment 2

The system (100) of System Embodiment 1, wherein said first processor (702) is configured to: operate (240) the enforcement node (JN1) to receive, prior to receiving (268) said indication that an invalid processing result (PN1R1) was received from the first processing node (PN1) in response to the first fishing task (FT1) assigned to the first processing node (PN1), i) an encrypted copy of the first fishing task script (ECFTS1); and ii) an encrypted copy of the first fishing task confirmed result (ECFTCR1); and operate (242) the enforcement node (JN1) to store said encrypted copy of the first fishing task script (ECFTS1); and the encrypted copy of the first fishing task confirmed result (ECFTCR1).

System Embodiment 3

The system (100) of System Embodiment 2, wherein said enforcement node (JN1) is a full block chain node that stores a full set of block chain information.

System Embodiment 4

The system (100) of System Embodiment 2, wherein said first processor (702) is further configured to: operating (272) the enforcement node (JN1) to receive from the first officer node (ON1) the first private key (PK1); and wherein the private key is used to confirm that the result (PN1FTR1) provided by the first processing node (PN1) in response to the first fishing task (FT1) was invalid.

System Embodiment 5

The system (100) of System Embodiment 2, wherein said indication that an invalid processing result (PN1FTR1) was received from a first processing node (PN1) in response to the first fishing task (FT1) assigned to the first processing node (PN1) is generated and broadcasted by a smart contract component (472) running on said first officer node (ON1).

System Embodiment 6

The system (100) of System Embodiment 1, wherein the first abstract (A1) is a proof in the form of a hash sequence generated by the first officer node (ON1) performing a hash of the first fishing task script (FTS1), a first fishing task confirmed result (FTCR1) corresponding to the first fishing task script (FTS1) and a first private key (PK1).

System Embodiment 7

The system (100) of System Embodiment 6, wherein said hash is a predetermined hash function known to the first officer node (ON1) and to the first enforcement node (JN1).

System Embodiment 8

The system (100) of System Embodiment 7, wherein said first processor (702) is configured to: decrypt (278), using the first private key (PK1): i) the encrypted copy of the first fishing task script (ECFTS1) to recover the first fishing task script (FTS1); and ii) the encrypted copy of the first fishing task confirmed result (ECFTCR1) to recover the first fishing task confirmed result (FTCR1), as part of being configured to operating (276) the enforcement node (JN1) to confirm that the result (PN1FTR1) provided by the first processing node (PN1) in response to the first fishing task (FT1) was invalid.

System Embodiment 9

The system (100) of System Embodiment 8 wherein said first processor (702) is further configured to: compare (280) the processing result (PN1FTR1) that was received from the first processing node (PN1) to the first fishing task confirmed result (FTCR1) to confirm that they do not match; and perform (282) a hash at the enforcement node (JN1) using the known hash function to hash the first fishing task script (FTS1), the first fishing task confirmed result (FTCR1) (corresponding to the first fishing task script (FTS1)) and the first private key (PK1) to produce a second hash result; and compare (284) the second hash result to the first fishing task abstract (A1) (which is a first hash result generated by ON1); and confirm (286) that the first processing node (PN1) provided an invalid result when both i) the second hash result matches the first fishing task abstract (A1) and ii) the first fishing task confirmed result (FTCR1) (corresponding to the first fishing task script (FTS1)) does not match the processing result (PN1FTR1) that was received from the first processing node (PN1), as part of being configured to operate (276) the enforcement node (JN1) to confirm that the result (PN1FTR1) provided by the first processing node (PN1) in response to the first fishing task (FT1) was invalid.

System Embodiment 10

The system (100) of System Embodiment 1, wherein said first processor is further configured to: operate (288) the enforcement node (JN1), in response to confirming that the first processing node (PN1) provided an invalid processing result in response to the first fishing task, to notify other nodes (102, 104, 106, 108, 112, 114, 116) in the network (100) that the first processing node (PN1) (114) is providing invalid processing results.

System Embodiment 11

The system (100) of System Embodiment 1, wherein said first processor (702) is further configured to: operate (290) the enforcement node (JN1), in response to confirming that the first processing node (PN1) provided an invalid processing result in response to the first fishing task, to further notify other nodes (102, 104, 106, 108, 112, 114, 116) in the network (100) that the first processing node (PN1) (114) is to be removed from a list of processing nodes which are to be permitted to provide processing services in response to processing requests from nodes in the network.

System Embodiment 12

The system (100) of System Embodiment 11, wherein said enforcement node (JN1) receives the processing result (PN1FTR1) returned by the first processing node (PN1) in a broadcast processing result message sent by the first processing node (PN1) to other nodes in the network or from the first officer node (ON1).

System Embodiment 13

The system (100) of System Embodiment 12, further comprising: said first officer node (ON1) (102), said first officer node including: a second processor (302) configured to: generate (204) a set of fishing tasks (FTs) and corresponding confirmed results to be used by enforcement purposes, said set of fishing tasks and corresponding confirmed results including at least a first fishing task script (FTS1) and a corresponding first fishing task confirmed result (FTCR1); and operate (252) the first officer node (ON1) to send the first fishing task script (FTS1) to said first processing node (PN1) to check processing being performed by said first processing node (PN1).

System Embodiment 14

The system (100) of System Embodiment 13, wherein said second processor (302) is further configured to: operate the first office node (102) to receive (254), at the first officer node (ON1), from the first processing node (PN1) the first fishing task result (PN1FTR1) generated by the first processing node (PN1); and check (256), at the first officer node (ON1) the first fishing task result (PN1FTR1) to determine if the result is valid.

System Embodiment 15

The system (100) of system embodiment 14, wherein said second processor is further configured to: compare (258), at the first officer node (ON1) the returned first fishing task result (PN1FTR1) to the previously stored first fishing task confirmed result (FTCR1); determine (264) that the returned first fishing task result (PN1FTR1) (from the first processing node PN1) is invalid when the returned first fishing task result (PN1FTR1) does not match the previously stored first fishing task confirmed result (FTCR1); and determine (262) that the returned first fishing task result (PN1FTR1) (from the first processing node PN1) is valid when the returned first fishing task result (PN1FTR1) matches the previously stored first fishing task confirmed result (FTCR1), as part of being configured to check (256) the first fishing task result (PN1FTR1) to determine if the result is valid.

System Embodiment 16

The system (100) of System Embodiment 15, wherein said second processor (320) is further configured to: operate (268) the first officer node (ON1) to communicate to the enforcement node (JN1) the indication that the first officer node (ON1) received the invalid processing result (PN1FTR1) from the first processing node (PN1) in response to the first fishing task (FT1) assigned to the first processing node (PN1); and operate (280) the first officer node (ON1) to communicate to the enforcement node (JN1) the first private key (PK1) to allow the enforcement node (JN1) to decrypt the previously supplied encrypted copy of the first fishing task confirmed result (ECFTCR1).

System Embodiment 17

The system (100) of System Embodiment 16, wherein said second processor (302) is configured to operate (210) the first officer node (ON1) to send said first fishing task script (FTS1) to a plurality of witness nodes (106, 108); and verify (220) that the witness nodes (106, 108) provide the same fishing task result (e.g., result WN1FTR1 from WN 1 is the same as result WNN2FTR1 from WN N2) to the first fishing task (which is a processing task, e.g. specified by the first fishing task script (FTS1)) before storing the first fishing task result as the first fishing task confirmed result (FTCR1) in said set of fishing tasks results and corresponding confirmed results, as part of being configured to operate the first officer node (ON1) to generate a set of fishing tasks and corresponding confirmed results to be used by enforcement purposes, said set of fishing tasks and corresponding confirmed results including at least the first fishing task script (FTS1) and corresponding first fishing task confirmed result (FTCR1).

System Embodiment 18

The system (100) of System Embodiment 17, wherein said witness nodes (106, 108) are processing nodes which are known to provide reliable processing results, said witness nodes (106, 108) being more reliable than said first processing node (PN1) (114).

Numbered List of Exemplary Non-Transitory Computer Readable Medium Embodiments:

Non-Transitory Computer Readable Medium Embodiment 1 A non-transitory computer readable medium (710) including computer executable instructions which when executed by a processor (702) control an enforcement node (110) to perform the steps of: receiving (246), at the enforcement node (e.g., judge node JN1) which maintains a copy of a block chain, from a first officer node (ON1), a first abstract (A1) of a first fishing task (FT1), said first abstract (A1) having been generated from at least i) a first private encryption key (PK1) and ii) a first fishing task confirmed result (FTCR1) corresponding to a fishing task script (FTS1), said first fishing task script (FTS1) specifying computations to be preformed as part of a first fishing task (FT1); storing (248), in the enforcement node (e.g., judge node 1 (JN1)), the first abstract; receiving (255) at the enforcement node (JN1) a first fishing task result (PN1FTR1), which is a processing result that was generated by a first processing node (PN1)

(this can be received in a broadcast from PN1 to the block chain); receiving (268) at the enforcement node (JN1) from the first officer node (ON1) an indication that an invalid processing result (PN1FTR1) was received from the first processing node (PN1) in response to the first fishing task (FT1) assigned to the first processing node (PN1); and operating (276) the enforcement node (JN1) to confirm that the result (PN1FTR1) provided by the first processing node (PN1) in response to the first fishing task (FT1) was invalid.

The techniques of various embodiments may be implemented using software, hardware and/or a combination of software and hardware. Various embodiments are directed to apparatus, e.g., personal computers, desk top computers, laptops, servers, cell phones, computer notepads, user devices, base stations, servers, customer premises equipment devices, network nodes, gateways, cluster controllers, cloud nodes, cloud service servers and/or network equipment devices. Various embodiments are also directed to methods, e.g., method of controlling and/or operating apparatus, e.g. various types of computers, user devices, base stations, gateways, servers, cable networks, cloud networks, nodes, servers, cloud service servers, customer premises equipment devices, controllers, and/or network equipment devices. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements are steps are implemented using hardware circuitry.

In various embodiments nodes and/or elements described herein are implemented using one or more components to perform the steps corresponding to one or more methods, for example, message reception, signal processing, sending, comparing, determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a controller, including a processor configured to implement one, multiple or all of the steps of one or more methods of the invention.

In some embodiments, the processor or processors, e.g., CPUs, of one or more devices, e.g., communications nodes such as controllers are configured to perform the steps of the methods described as being performed by the communications nodes, e.g., controllers. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., communications node such as a cluster controller including, with a processor which includes a component corresponding to each of the steps of the various described methods performed by the device in which the processor is included. In some but not all embodiments a device, e.g., communications node such as a controller, includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a controller or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a controller or other device described in the present application. In some embodiments components are implemented as hardware devices in such embodiments the components are hardware components. In other embodiments components maybe implemented as software, e.g., a set of processor or computer executable instructions. Depending on the embodiment the components maybe all hardware components, all software components, a combination of hardware and/or software or in some embodiments some components are hardware components while other components are software components.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A processing verification method for use in a system including multiple network nodes, the method comprising:
receiving, at an enforcement node which maintains a copy of a block chain, from a first officer node, a first abstract (A1) of a first fishing task (FT1), said first abstract (A1) having been generated from at least i) a first private encryption key (PK1) and ii) a first fishing task confirmed result (FTCR1) corresponding to a fishing task script (FTS1), said first fishing task script (FTS1) specifying computations to be performed as part of said first fishing task (FT1);
storing, in the enforcement node, the first abstract (A1);
receiving at the enforcement node a first fishing task result (PN1FTR1), which is a processing result that was generated by a first processing node;
receiving at the enforcement node from the first officer node an indication that an invalid processing result (PN1FTR1) was received from the first processing node in response to the first fishing task (FT1) assigned to the first processing node; and
operating the enforcement node to confirm that the result (PN1FTR1) provided by the first processing node in response to the first fishing task (FT1) was invalid.

2. The method of claim 1, further comprising:
operating the enforcement node to receive, prior to receiving said indication that an invalid processing result (PN1FTR1) was received from the first processing node in response to the first fishing task (FT1) assigned to the first processing node, i) an encrypted copy of the first fishing task script (ECFTS1); and ii) an encrypted copy of the first fishing task confirmed result (ECFTCR1); and
operating the enforcement node to store said encrypted copy of the first fishing task script (ECFTS1); and the encrypted copy of the first fishing task confirmed result (ECFTCR1).

3. The method of claim 2, further comprising:
operating the enforcement node to receive from the first officer node the first private key (PK1); and
wherein the private key is used to confirm that the result (PN1FTR1) provided by the first processing node (PN1) in response to the first fishing task (FT1) was invalid.

4. The method of claim 1, wherein the first abstract (A1) is a proof in the form of a hash sequence generated by the first officer node performing a hash of the first fishing task script (FTS1), a first fishing task confirmed result (FTCR1) corresponding to the first fishing task script (FTS1) and the first private key (PK1).

5. The method of claim 4, wherein said hash is a predetermined hash function known to the first officer node and to the first enforcement node.

6. The method of claim 5, wherein operating the enforcement node to confirm that the result (PN1FTR1) provided by the first processing node (PN1) in response to the first fishing task (FT1) was invalid includes:
decrypting, using the first private key (PK1) to decrypt: i) the encrypted copy of the first fishing task script (ECFTS1) to recover the first fishing task script (FTS1); and ii) the encrypted copy of the first fishing task confirmed result (ECFTCR1) to recover the first fishing task confirmed result (FTCR1).

7. The method of claim 6, wherein operating the enforcement node to confirm that the result (PN1FTR1) provided by the first processing node in response to the first fishing task (FT1) was invalid further includes:
comparing the processing result (PN1FTR1) that was received from the first processing node to the first fishing task confirmed result (FTCR1) to confirm that they do not match; and
performing a hash at the enforcement node using the known hash function to hash the first fishing task script (FTS1), the first fishing task confirmed result (FTCR1) and the first private key (PK1) to produce a second hash result; and
comparing the second hash result to the first fishing task abstract (A1); and
confirming that the first processing node provided an invalid result when both i) the second hash result matches the first fishing task abstract (A1) and ii) the first fishing task confirmed result (FTCR1) does not match the processing result (PN1FTR1) that was received from the first processing node.

8. The method of claim 1, further comprising:
operating the enforcement node, in response to confirming that the first processing node provided an invalid processing result in response to the first fishing task, to notify other nodes in the network that the first processing node is providing invalid processing results.

9. The method of claim 1, further comprising:
operating the enforcement node, in response to confirming that the first processing node provided an invalid processing result in response to the first fishing task, to further notify other nodes in the network that the first processing node is to be removed from a list of processing nodes which are to be permitted to provide processing services in response to processing requests from nodes in the network.

10. The method of claim 9, further comprising:
operating the first officer node to generate a set of fishing tasks (FTs) and corresponding confirmed results to be used by enforcement purposes, said set of fishing tasks and corresponding confirmed results including at least a first fishing task script (FTS1) and a corresponding first fishing task confirmed result (FTCR1); and
operating the first officer node to send the first fishing task script (FTS1) to said first processing node to check processing being performed by said first processing node.

11. The method of claim 10, further comprising:
receiving, at the first officer node, from the first processing node the first fishing task result (PN1FTR1) generated by the first processing node; and
checking, at the first officer node the first fishing task result (PN1FTR1) to determine if the result is valid.

12. The method of claim 11, further comprising:
operating the first officer node to communicate to the enforcement node the indication that the first officer node received the invalid processing result (PN1FTR1) from the first processing node in response to the first fishing task (FT1) assigned to the first processing node; and
operating the first officer node to communicate to the enforcement node the first private key (PK1) to allow the enforcement node to decrypt the previously supplied encrypted copy of the first fishing task confirmed result (ECFTCR1).

13. The method of claim 12, wherein operating the first officer node to generate a set of fishing tasks and corresponding confirmed results to be used by enforcement purposes, said set of fishing tasks and corresponding confirmed results including at least the first fishing task script (FTS1) and corresponding first fishing task confirmed result (FTCR1) includes:
operating the first officer node to send said first fishing task script (FTS1) to a plurality of witness nodes; and
verifying that the witness nodes provide the same fishing task result to the first fishing task before storing the first fishing task result as the first fishing task confirmed result (FTCR1) in said set of fishing tasks results and corresponding confirmed results.

14. A system comprising:
an enforcement node including:
a first processor configured to:
operate the enforcement node to receive, at the enforcement node which maintains a copy of a block chain, from a first officer node, a first abstract (A1) of a first fishing task (FT1), said first abstract (A1) having been generated from at least i) a first private encryption key (PK1) and ii) a first fishing task confirmed result (FTCR1) corresponding to a fishing task script (FTS1), said first fishing task script (FTS1) specifying computations to be performed as part of said first fishing task (FT1);
store, in the enforcement node, the first abstract (A1);
operate the enforcement node to receive at the enforcement node a first fishing task result (PN1FTR1), which is a processing result that was generated by a first processing node;
operate the enforcement node to receive at the enforcement node from the first officer node an indication that an invalid processing result (PN1FTR1) was received from the first processing node in response to the first fishing task (FT1) assigned to the first processing node; and
confirm that the result (PN1FTR1) provided by the first processing node in response to the first fishing task (FT1) was invalid.

15. The system of claim 14, wherein the first abstract (A1) is a proof in the form of a hash sequence generated by the first officer node performing a hash of the first fishing task script (FTS1), a first fishing task confirmed result (FTCR1) corresponding to the first fishing task script (FTS1) and a first private key (PK1); and
wherein said hash is a predetermined hash function known to the first officer node and to the enforcement node.

16. The system of claim 15, wherein said first processor is configured to:
decrypt, using the first private key (PK1): i) the encrypted copy of the first fishing task script (ECFTS1) to recover the first fishing task script (FTS1); and ii) the encrypted copy of the first fishing task confirmed result (ECFTCR1) to recover the first fishing task confirmed result (FTCR1),
as part of being configured to operate the enforcement node to confirm that the result (PN1FTR1) provided by the first processing node in response to the first fishing task (FT1) was invalid.

17. The system of claim 16, wherein said first processor is further configured to:
compare the processing result (PN1FTR1) that was received from the first processing node to the first fishing task confirmed result (FTCR1) to confirm that they do not match; and perform a hash at the enforcement node using the known hash function to hash the first fishing task script (FTS1), the first fishing task confirmed result (FTCR1) and the first private key (PK1) to produce a second hash result; and
compare the second hash result to the first fishing task abstract (A1); and
confirm that the first processing node provided an invalid result when both i) the second hash result matches the first fishing task abstract (A1) and ii) the first fishing task confirmed result (FTCR1) does not match the processing result (PN1FTR1) that was received from the first processing node,
as part of being configured to operate the enforcement node to confirm that the result (PN1FTR1) provided by the first processing node in response to the first fishing task (FT1) was invalid.

18. The system of claim 14, wherein said first processor is further configured to:
operate the enforcement node, in response to confirming that the first processing node provided an invalid processing result in response to the first fishing task, to notify other nodes in the network that the first processing node is providing invalid processing results.

19. The system of claim 14, further comprising:
said first officer node, said first officer node including:
a second processor configured to:
generate a set of fishing tasks (FTs) and corresponding confirmed results to be used by enforcement purposes, said set of fishing tasks and corresponding confirmed results including at least said first fishing task script (FTS1) and said corresponding first fishing task confirmed result (FTCR1); and
operate the first officer node to send the first fishing task script (FTS1) to said first processing node to check processing being performed by said first processing node.

20. A non-transitory computer readable medium including computer executable instructions which when executed by a processor control an enforcement node to perform the steps of:
receiving, at the enforcement node which maintains a copy of a block chain, from a first officer node, a first abstract (A1) of a first fishing task (FT1), said first abstract (A1) having been generated from at least i) a first private encryption key (PK1) and ii) a first fishing task confirmed result (FTCR1) corresponding to a fishing task script (FTS1), said first fishing task script (FTS1) specifying computations to be performed as part of said first fishing task (FT1);
storing, in the enforcement node, the first abstract (A1);
receiving at the enforcement node a first fishing task result (PN1FTR1), which is a processing result that was generated by a first processing node;
receiving at the enforcement node from the first officer node an indication that an invalid processing result (PN1FTR1) was received from the first processing node in response to the first fishing task (FT1) assigned to the first processing node; and
operating the enforcement node to confirm that the result (PN1FTR1) provided by the first processing node in response to the first fishing task (FT1) was invalid.

* * * * *